(12) United States Patent
Yager et al.

(10) Patent No.: US 11,341,579 B1
(45) Date of Patent: May 24, 2022

(54) PROCESSING AN APPLICATION FOR INSURANCE COVERAGE

(71) Applicant: Allstate Insurance Company, Northbrook, IL (US)

(72) Inventors: Floyd M. Yager, Park Ridge, IL (US); Thomas J. Wilson, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 339 days.

(21) Appl. No.: 16/199,575

(22) Filed: Nov. 26, 2018

Related U.S. Application Data

(63) Continuation of application No. 13/905,957, filed on May 30, 2013, now abandoned, which is a continuation of application No. 13/112,825, filed on May 20, 2011, now abandoned, which is a continuation of application No. 12/959,108, filed on Dec. 2, 2010, now Pat. No. 8,219,426, which is a continuation of application No. 12/903,861, filed on Oct. 13, 2010, now Pat. No. 8,046,246, which is a continuation of application No. 12/793,325, filed on Jun. 3, 2010, now Pat. No. 8,046,244, which is a continuation of application No. 11/551,595, filed on Oct. 20, 2006, now Pat. No. 7,774,217, which is a continuation-in-part of application No. 11/270,611, filed on Nov. 10, 2005, now abandoned.

(60) Provisional application No. 60/629,318, filed on Nov. 19, 2004.

(51) Int. Cl.
   *G06Q 40/08* (2012.01)

(52) U.S. Cl.
   CPC .................. *G06Q 40/08* (2013.01)

(58) Field of Classification Search
   CPC ..................................................... G06Q 40/08
   See application file for complete search history.

(56) References Cited

U.S. PATENT DOCUMENTS

| | | | |
|---|---|---|---|
| 4,567,359 A | 1/1986 | Lockwood | |
| 4,667,336 A | 5/1987 | Best | |
| 4,776,336 A | 10/1988 | Karasawa | |
| 4,843,578 A | 6/1989 | Wade | |
| 5,191,522 A | 3/1993 | Bosco et al. | |
| 5,359,528 A | 10/1994 | Haendel et al. | |

(Continued)

FOREIGN PATENT DOCUMENTS

| | | |
|---|---|---|
| CA | 2231459 A1 | 2/1997 |
| CA | 2235566 A1 | 8/1999 |

(Continued)

OTHER PUBLICATIONS

Oct. 10, 2013—U.S. Office Action—U.S. Appl. No. 11/774,423.

(Continued)

*Primary Examiner* — Robert A Sorey
*Assistant Examiner* — Kimberly A. Sass
(74) *Attorney, Agent, or Firm* — Polsinelli PC

(57) ABSTRACT

Systems and methods provide customizable insurance according to consumer preferences. Demand simulators may be used to guide the creation of optimized packages of features, which consumers may select from to form an insurance product appropriate for their particular needs. Packages may be formed with a particular appeal to consumers with common characteristics. In addition, methods are provided for selling insurance products formed through an optimization process and providing corresponding insurance services.

15 Claims, 9 Drawing Sheets

(56) References Cited

U.S. PATENT DOCUMENTS

| | | |
|---|---|---|
| 5,430,432 A | 7/1995 | Camhi et al. |
| 5,483,442 A | 1/1996 | Black et al. |
| 5,499,182 A | 3/1996 | Ousborne |
| 5,550,551 A | 8/1996 | Alesio |
| 5,638,273 A | 6/1997 | Coiner et al. |
| 5,752,236 A | 5/1998 | Sexton et al. |
| 5,797,134 A | 8/1998 | McMillan et al. |
| 5,845,256 A | 12/1998 | Pescitelli et al. |
| 5,864,305 A | 1/1999 | Rosenquist |
| 5,873,066 A | 2/1999 | Underwood et al. |
| 5,877,707 A | 3/1999 | Kowalick |
| 5,893,072 A | 4/1999 | Zizzamia |
| 5,950,169 A | 9/1999 | Borghesi et al. |
| 5,963,951 A | 10/1999 | Collins |
| 6,026,364 A | 2/2000 | Whitworth |
| 6,029,139 A | 2/2000 | Cunningham et al. |
| 6,044,352 A | 3/2000 | Deavers |
| 6,064,970 A | 5/2000 | McMillan et al. |
| 6,092,047 A | 7/2000 | Hyman et al. |
| 6,185,540 B1 | 2/2001 | Schreitmueller et al. |
| 6,185,567 B1 | 2/2001 | Ratnaraj et al. |
| 6,397,212 B1 | 5/2002 | Biffar |
| 6,466,919 B1 | 10/2002 | Walker et al. |
| 6,502,020 B2 | 12/2002 | Lang |
| 6,735,569 B1 | 5/2004 | Wizig |
| 6,795,759 B2 | 9/2004 | Doyle |
| 6,795,795 B2 | 9/2004 | Kreichauf |
| 6,868,386 B1 | 3/2005 | Henderson et al. |
| 6,925,441 B1 | 8/2005 | Jones, III et al. |
| 6,978,249 B1 | 12/2005 | Beyer et al. |
| 6,980,098 B2 | 12/2005 | Shinada et al. |
| 7,035,935 B1 | 4/2006 | Voois et al. |
| 7,188,070 B2 | 3/2007 | Dar et al. |
| 7,333,939 B1 | 2/2008 | Stender et al. |
| 7,346,525 B1 | 3/2008 | Milanovich |
| 7,366,675 B1 | 4/2008 | Walker et al. |
| 7,398,218 B1 | 7/2008 | Bernaski et al. |
| 7,409,355 B1 | 8/2008 | Guyan et al. |
| 7,505,921 B1 | 3/2009 | Lukas et al. |
| 7,774,217 B1 | 8/2010 | Yager et al. |
| 7,904,327 B2 | 3/2011 | Phelan et al. |
| 7,941,329 B2 | 5/2011 | Kenedy et al. |
| 8,046,244 B1 | 10/2011 | Yager et al. |
| 8,046,246 B1 | 10/2011 | Yager et al. |
| 8,219,426 B1 | 7/2012 | Yager et al. |
| 8,219,427 B1 | 7/2012 | Yager et al. |
| 9,875,508 B1 | 1/2018 | Yager et al. |
| 10,878,506 B1 | 12/2020 | Yager et al. |
| 2001/0014868 A1 | 8/2001 | Herz et al. |
| 2001/0042002 A1 | 11/2001 | Koopersmith |
| 2001/0044733 A1 | 11/2001 | Lee et al. |
| 2002/0002475 A1 | 1/2002 | Freedman et al. |
| 2002/0002502 A1 | 1/2002 | Maes et al. |
| 2002/0004730 A1 | 1/2002 | Yoshioka et al. |
| 2002/0007289 A1 | 1/2002 | Malin et al. |
| 2002/0010598 A1 | 1/2002 | Johnson et al. |
| 2002/0010599 A1 | 1/2002 | Levison |
| 2002/0013754 A1 | 1/2002 | Frank et al. |
| 2002/0032586 A1 | 3/2002 | Joao |
| 2002/0035488 A1 | 3/2002 | Aquila et al. |
| 2002/0049617 A1 | 4/2002 | Lencki et al. |
| 2002/0087364 A1 | 7/2002 | Lerner et al. |
| 2002/0095316 A1 | 7/2002 | Toan et al. |
| 2002/0099596 A1 | 7/2002 | Geraghty |
| 2002/0103677 A1 | 8/2002 | Sexton et al. |
| 2002/0103678 A1 | 8/2002 | Burkhalter et al. |
| 2002/0111725 A1 | 8/2002 | Burge |
| 2002/0116228 A1 | 8/2002 | Bauer et al. |
| 2002/0116231 A1 | 8/2002 | Hele et al. |
| 2002/0120474 A1 | 8/2002 | Hele et al. |
| 2002/0120476 A1 | 8/2002 | Labelle et al. |
| 2002/0128882 A1 | 9/2002 | Nakagawa et al. |
| 2002/0143680 A1 | 10/2002 | Walters et al. |
| 2002/0152115 A1 | 10/2002 | Morita et al. |
| 2002/0161779 A1 | 10/2002 | Brierley et al. |
| 2002/0178033 A1 | 11/2002 | Yoshioka et al. |
| 2002/0188454 A1 | 12/2002 | Sauber |
| 2002/0188480 A1 | 12/2002 | Liebeskind et al. |
| 2002/0188484 A1 | 12/2002 | Grover et al. |
| 2002/0194033 A1 | 12/2002 | Huff |
| 2002/0198801 A1 | 12/2002 | Dixon et al. |
| 2003/0061132 A1 | 3/2003 | Yu et al. |
| 2003/0105682 A1 | 6/2003 | Dicker et al. |
| 2003/0139985 A1 | 7/2003 | Hollar et al. |
| 2003/0171959 A1 | 9/2003 | Galloway |
| 2003/0177032 A1 | 9/2003 | Bonissone et al. |
| 2003/0182165 A1 | 9/2003 | Kato et al. |
| 2003/0187702 A1 | 10/2003 | Bonissone et al. |
| 2003/0187704 A1 | 10/2003 | Hashiguchi et al. |
| 2004/0024619 A1 | 2/2004 | DiBella |
| 2004/0039503 A1 | 2/2004 | Doyle |
| 2004/0039609 A1 | 2/2004 | Burkitt |
| 2004/0039610 A1 | 2/2004 | Weitermann et al. |
| 2004/0103022 A1 | 5/2004 | Chilcoat et al. |
| 2004/0103065 A1 | 5/2004 | Kishen et al. |
| 2004/0117217 A1 | 6/2004 | Reber et al. |
| 2004/0133542 A1 | 7/2004 | Doerksen et al. |
| 2004/0153362 A1 | 8/2004 | Bauer et al. |
| 2004/0193455 A1 | 9/2004 | Kellington |
| 2004/0230459 A1 | 11/2004 | Dordick et al. |
| 2004/0230460 A1 | 11/2004 | Thomas et al. |
| 2004/0249643 A1 | 12/2004 | Ouyang et al. |
| 2004/0260579 A1 | 12/2004 | Tremiti |
| 2005/0102172 A1 | 5/2005 | Sirmans |
| 2005/0108064 A1 | 5/2005 | Castleman et al. |
| 2005/0137913 A1 | 6/2005 | Laning et al. |
| 2005/0267774 A1 | 12/2005 | Merritt et al. |
| 2006/0041454 A1 | 2/2006 | Matisonn et al. |
| 2006/0053038 A1 | 3/2006 | Warren et al. |
| 2006/0059020 A1 | 3/2006 | Davidson |
| 2006/0074724 A1 | 4/2006 | Schwartz et al. |
| 2006/0106670 A1 | 5/2006 | Cai et al. |
| 2006/0143053 A1 | 6/2006 | Van Rensburg |
| 2006/0155587 A1 | 7/2006 | Sparrow |
| 2006/0253307 A1 | 11/2006 | Warren et al. |
| 2007/0027726 A1 | 2/2007 | Warren et al. |
| 2007/0100668 A1 | 5/2007 | Webb |
| 2007/0118411 A1 | 5/2007 | Conner et al. |
| 2007/0136104 A1 | 6/2007 | Bowen et al. |
| 2007/0136109 A1 | 6/2007 | Yager et al. |
| 2011/0029366 A1 | 2/2011 | Bernstein |
| 2011/0178908 A1 | 7/2011 | Benefield et al. |

FOREIGN PATENT DOCUMENTS

| | | |
|---|---|---|
| CA | 2321459 A1 | 4/2001 |
| EP | 0341537 A2 | 11/1989 |
| EP | 1050853 A1 | 11/2000 |
| EP | 1083510 A1 | 3/2001 |
| EP | 1160707 A1 | 12/2001 |
| EP | 1313043 A1 | 5/2003 |
| EP | 1557779 A1 | 7/2005 |
| EP | 1557780 A1 | 7/2005 |
| EP | 1746537 A2 | 1/2007 |
| FR | 2801262 A1 | 5/2001 |
| GB | 2143978 A | 2/1985 |
| JP | H02117237 A | 5/1990 |
| JP | H02149984 A | 6/1990 |
| JP | H02203108 A | 8/1990 |
| JP | H04182868 A | 6/1992 |
| JP | 02117237 | 4/2002 |
| JP | 2002149984 A | 5/2002 |
| JP | 2002203108 A | 7/2002 |
| JP | 200341537 | 2/2003 |
| JP | 2003168006 A | 6/2003 |
| JP | 2004249552 A | 9/2004 |
| JP | 2006168006 A | 6/2006 |
| JP | 2006341537 A | 12/2006 |
| JP | 2007257602 A | 10/2007 |
| JP | 4182868 B2 | 11/2008 |
| KR | 20020045186 A | 6/2002 |
| KR | 20020075327 A | 10/2002 |
| KR | 20020091629 A | 12/2002 |
| KR | 20030043196 A | 6/2003 |

(56) References Cited

FOREIGN PATENT DOCUMENTS

| WO | 9727561 A1 | 7/1997 |
|---|---|---|
| WO | WO-0139090 A1 | 5/2001 |
| WO | 0184427 A2 | 11/2001 |
| WO | 0203163 | 1/2002 |
| WO | 0215090 A1 | 2/2002 |
| WO | 2002015079 A1 | 2/2002 |
| WO | 0221375 A2 | 3/2002 |
| WO | 02079919 A2 | 10/2002 |
| WO | 02086422 A1 | 10/2002 |
| WO | 02088889 A2 | 11/2002 |
| WO | 2004015535 A2 | 2/2004 |
| WO | 2004044696 A2 | 5/2004 |
| WO | 2008016350 A1 | 2/2008 |
| WO | 2008054722 A2 | 5/2008 |
| WO | 2009006617 A1 | 1/2009 |
| WO | 139090 A2 | 1/2013 |
| WO | WO-2013009090 A2 | 1/2013 |

OTHER PUBLICATIONS

Aug. 6, 2014 U.S. Office Action—U.S. Appl. No. 13/905,957.
Jul. 16, 2014 U.S. Office Action—U.S. Appl. No. 14/018,913.
Mar. 5, 2014 U.S. Final Office Action—U.S. Appl. No. 13/730,079.
May 5, 2014 U.S.—Non-Final Office Action—U.S. Appl. No. 13/730,079.
Nov. 13, 2014 U.S. Non-Final Office Action—U.S. Appl. No. 13/730,079.
Oct. 7, 2014 U.S. Non-Final Office Action—U.S. Appl. No. 11/774,423.
Oct. 7, 2014 U.S. Non-Final Office Action—U.S. Appl. No. 11/774,442.
Sep. 11, 2014 U.S. Non-Final Office Action—U.S. Appl. No. 11/774,423.
Apr. 28, 2015 U.S. Final Office Action—U.S. Appl. No. 13/905,957.
Apr. 30, 2015 U.S. Final Office Aciton—U.S. Appl. No. 13/730,079.
Aug. 10, 2015 U.S. Final Office Action—U.S. Appl. No. 13/353,218.
Aug. 13, 2015 U.S. Final Office Action—U.S. Appl. No. 13/278,432.
Aug. 19, 2015 U.S. Final Office Action—U.S. Appl. No. 14/311,046.
Aug. 25, 2015 U.S. Final Office Action—U.S. Appl. No. 12/426,667.
Aug. 6, 2015 U.S. Final Office Action—U.S. Appl. No. 14/060,326.
Dec. 1, 2015—U.S. Final Office Action—U.S. Appl. No. 14/060,326.
Feb. 10, 2015 U.S. Final Office Action—U.S. Appl. No. 14/018,913.
Feb. 10, 2015 U.S. Non-Final Office Action—U.S. Appl. No. 14/501,282.
Feb. 10, 2015 U.S. Non-Final Office Action—U.S. Appl. No. 14/501,287.
Feb. 11, 2015 U.S. Non-Final Office Action—U.S. Appl. No. 12/426,667.
Feb. 11, 2015 U.S. Non-Final Office Action—U.S. Appl. No. 14/501,266.
Feb. 20, 2015 U.S. Non-Final Office Action—U.S. Appl. No. 14/060,326.
Jan. 13, 2015 U.S.—Non-Final Office Action—U.S. Appl. No. 13/905,957.
Jan. 13, 2015 U.S.—Non-Final Office Action—U.S. Appl. No. 14/311,046.
Jan. 29, 2015 U.S. Non-Final Office Action—U.S. Appl. No. 13/278,432.
Jun. 9, 2015—U.S. Non-Final Office Action—U.S. Appl. No. 14/018,913.
Mar. 2, 2015 U.S. Final Office Action—U.S. Appl. No. 11/774,423.
Mar. 2, 2015 U.S. Non-Final Office Action—U.S. Appl. No. 13/353,218.
May 14, 2015 U.S. Final Office Action—U.S. Appl. No. 11/774,442.
May 20, 2015 U.S. Final Office Action—U.S. Appl. No. 14/501,266.
May 20, 2015 U.S. Final Office Action—U.S. Appl. No. 14/501,282.
May 21, 2015 U.S. Final Office Action—U.S. Appl. No. 14/501,287.
Nov. 30, 2015—U.S. Final Office Action—U.S. Appl. No. 14/018,913.
Oct. 5, 2015 U.S. Non-Final Office Action U.S. Appl. No. 13/905,957.
Oct. 8, 2015 U.S.—Non-Final Office Action—U.S. Appl. No. 14/501,287.
Oct. 8, 2015—U.S. Non-Final Office Action—U.S. Appl. No. 14/501,282.
Oct. 28, 2015—U.S. Non-Final Office Action—U.S. Appl. No. 11/774,423.
Sep. 22, 2015 U.S. Non-Final Office Action—U.S. Appl. No. 13/730,079.
Aug. 18, 2016—U.S. Non-Final Office Action—U.S. Appl. No. 11/774,423.
Aug. 26, 2016—U.S. Final Office Action—U.S. Appl. No. 13/278,432.
Dec. 1, 2016—U.S. Non-Final Office Action—U.S. Appl. No. 12/426,667.
Dec. 2, 2016—U.S. Final Office Action—U.S. Appl. No. 14/139,048.
Feb. 5, 2016—U.S. Non-Final Office Action—U.S. Appl. No. 13/112,825.
Feb. 25, 2016—U.S. Non-Final Office Action—U.S. Appl. No. 13/278,432.
Jul. 29, 2016—U.S. Non-Final Office Action—U.S. Appl. No. 13/112,825.
Jul. 8, 2016 U.S.—Non-Final Office Action—U.S. Appl. No. 13/353,218.
Jul. 15, 2016 U.S. Final Office Action—U.S. Appl. No. 14/060,326.
Rate Quote Request. HART0000020-HART0000022.
Rating Information—New Jersey Includes the text "V6638 (Mar. 1999)".
Replacement Cost Coverage Includes the text "AUT079-0801".
Replacement Cost for Your Cars Includes the text "AMP 101 (Jan. 1983)".
Request Your Quote Online, The Hartford Page HART0000002 includes the text "02IRV1-1".
Request Your Quote Online, The Hartford Page HART0000013 may include the text "02â€¦".
Responsible Driver Guarantee, [On-line], [attached copy retrieved on Jun. 4, 2008], Retrieved from the Internet: File://D:\np/responsibledriver.htm.
Rewarding Safe Drivers; Apr. 25, 2002—News Release [on-line], [Attached copy retrieved on Dec. 7, 2007]. Retrieved from the internet: http://www.sgi.sk.ca/news_releases/2002/apr_25_2002.htm.
Rhode Island Revised Index, Rules and Rates—"Date: Mar. 11, 2002"—Filing No. R13159; pp. 1-56.
Road Safety Council Bill 2001; Apr. 11, 2002 [on-line] Attached copy retrieved from the Internet: http://www.parliament.wa.gov.au/hansard/hans35.nsf(ATT)/B3CFBB73FDE9421BC825733F002600FC/$file/C36+S1+20020411+p9427d-943la.pdf.
Road Service Includes the text "AMP570 (Jul. 2000)".
Safeco's New Auto Policy Gives Insurance Customers More Choices, printed from http://www.safeconews.com/pressrelease.php?p_id=78, Seattle—(Jul. 20, 2006). (Exhibit B—2 pages).
Sales Sheet for Motor Home / Travel Trailer, American Modern Insurance Group, Inc.; Includes the text "Motor Home-GRO-G (Oct. 2004)".
Schreiner, John—Lost and found: A Vancouver firm hopes its online service will make it easier to get lost items back to their owners, (Publication Date Alleged by Nationwide—Sep. 2003) (includes text: "Copyright Ottawa Citizen 2001"); p. 1-3.
Seeing Auto and Homeowning Customers in a New Light, The Hartford; includes the text "© 2003 The Hartford, Hartford, CT 06115".
Shore, David CBC's Fuzzy Logic (Publication Date Alleged by Nationwide—Jul. 1997) (includes text: "Copyright 18 Vancouver Sun 1997"); p. 1-2.
SmartApp Next Generation (SNG) Training Guide; includes the text "Last Revised Oct. 23, 2003".
Stephen S. Makgill; Panel Discussion—May 1963 Meeting; "An Analysis of the Adequacy of the Various Factors and Rating Values Used in Retrospective Eating"; pp. 32-49; ; Proceedings of the Casualty Actuarial Society; May 1963, Oct. 1963; pp. 32-49; vol. L.
Steuer, Anthony, et al. Another Market-Conduct Maelstrom Brewing, (Publication Date Alleged by Nationwide—Apr. 2001) (includes text: "Copyright 2001, A.M. Best Company"); p. 1-4.
Take Advantage Auto Insurance Discounts, Dec. 8, 2008 [on-line], [attached copy retrieved on Apr. 20, 2009]. Retrieved from internet: http://www.insurance.com/quotes/article.aspx/Take_Advantage_Auto_Insurance_Discounts/artid/160.

(56) References Cited

OTHER PUBLICATIONS

Target Markets News and Information Newsletter. Feb. 2004. http://www.odbcworkz.com/htmlmail/targetmkts/febnews/feb04news.pdf.
Team Talk, General MasterCraft Topics, General Discussions, Insurance prices?—Retrieved from the internet: <URL: http://www.mastercraft.com/teamtalk/archive/index.php/t-512.html (Publication Date Alleged by Nationwide—2004) (includes text: "comments dated Sep. 2, 2004"); p. 1-4.
Temporary Archives—Towing and Hauling, Retrieved from the internet: <URL:http://www.thedieselstop.com/archives/ubbthreads/Towing1/showflat.php-Cat=&Number=6 . . . > (Publication Date Alleged by Nationwide—2001) (includes text: "All else copyright 1997-2001"); p. 1-16.
The Cambridge Group, Driving Multi-Billion Dollar Growth in a "Commodity" Insurance Market, printed from http://www.thecambridgegroup.com/casestudies/casestudy03.php. (Exhibit B—1 page).
The Courier, Accidents don't always raise insurance rate, Jan. 1, 1984, p. 2C.
The Safest Cars of 91, Published Date Dec. 3, 1990, edition U.S. News and World Report; Edward Baig.
Timoteo, Paul, "A Total Loss", Aug. 1, 2002, Canadian Underwriter, pp. 1-4.
Tuition Waiver Coverage, Thomas A. McCoy, Rough Notes, vol. 140, Jun. 1997, No. 6, 4 pages, ISSN: 0035-8525.
Uninsured Motorists Coverage—New Jersey Includes the text "AMP529A (Mar. 1999)".
Uninsured/Underinsured Motorists Coverage Exclusion Endorsement Includes the text "V476 (Feb. 1988)".
Vaughan Emmett J., et al., Fundamentals of Risk and Insurance; (Publication Date Alleged by Nationwide—2003) (includes text: "New York 2003"), p. 1-113.
Vercammen, James, Optimal Insurance with Nonseparable Background Risk; (Publication Date Alleged by Nationwide—2001) (includes text: "Copyright The Journal of Risk and Insurance, 2001, vol. 68, No. 3") p. 437-448.
Waiver of Collision Deductible p. 1 (includes text: "AA 0070 (Nov. 2003)").
Walters, Michael A., Homeowners Insurance Ratemaking; Retrieved from the internet: <URL: http://www.casact.org/pubs/proceed/proceed74/74015.pdf> p. 15-57 (Publication Date Alleged by Nationwide 1974).
Water Back-Up of Sewers or Drains Includes the text "HOME22-0205".
Water Back-Up of Sewers or Drains Includes the text "HOME22-0701".
Webwire, Insurancewide addresses the public's mistrust in the price comparison industry, http://www.webwire.com/ViewPressRel.asp?ald=85762, Jan. 28, 2009, 2 pages, London.
Wiening, Eric A., Foundations of Risk Management and Insurance Pennsylvania 2002—(Publication Date Alleged by Nationwide—2002), p. 1-142.
Wikipedia Webpage on Focus Groups. May 8, 2004. http://web.archive.org/web/20040508214920/http://en.wikipedia.org/wiki/Focus_group.
Woller, "Is Your Car Worth Less Than Your Loan?", Feb. 1, 2001, URL: http://www.wolleranger.com/lessthanloan.html, 4 pp.
www.dtins.com. retrieved from web.archive.org.auto.html (Jun. 21, 2003). auto-xtras.html (Oct. 29, 2003).
www.esurance.com, retrieved from web.archive.org, commitment.asp (Feb. 14, 2003), car_insurance_coverage.asp (Oct. 3, 2003), buy_auto_insurance_policy.asp (Mar. 5, 2003), auto_insurance_policy_changes.asp (Mar. 18, 2004).
YCA Sensation Reignites Excitement Around Allstate Your Choice Auto. Nov. 6, 2007 [On-line], [attached copy retrieved on Nov. 11, 2007] Retrieved from the Internet: http://cr/allstateenow/allstate/2007-11-06-YCA.htm.
Zinkewica, Paul. Specialty Niche Programs Take on Increasing Importance for Growth-Orientated Agencies. Nov. 1994. Rough Notes. http://findarticles.com/p/articles/mi_qa3615/is_199411/ai_n8709928.
Feb. 13, 2019—U.S. Final Office Action—U.S. Appl. No. 11/774,423.
May 24, 2019—U.S. Non-Final Office Action—U.S. Appl. No. 11/774,423.
$2500 Deductible Reserve Fund Includes the text "AMP 158A (Nov. 1994)".
Sep. 13, 2006: Revised Hearing Notice Proposed Amendments to 211 CMR 134.00—Safe Driver Insurance Plan; dated: Aug. 21, 2006; p. 1-28. http://146.243.60.39/ocabr/business/insurance/doi-regulatory-info/doi-public-hearings/2006-doi-public-hearings/09-13-2006-revised-hearing-notice-proposed.html.
Oct. 15, 2008 U.S. Office Action—U.S. Appl. No. 11/774,423.
Aug. 6, 2009 U.S. —Non-Final Office Action—U.S. Appl. No. 11/774,442.
Dec. 16, 2009 U.S. Final Office Action—U.S. Appl. No. 11/774,442.
Dec. 8, 2009 U.S. Final Office Action—U.S. Appl. No. 11/551,595.
Jun. 17, 2009 U.S. Supplemental Final Office Action—U.S. Appl. No. 11/774,423.
Mar. 6, 2009 U.S. Examiner Interview Summary—U.S. Appl. No. 11/774,423.
May 22, 2009 U.S. Office Action—U.S. Appl. No. 11/551,595.
May 27, 2009 U.S. Final Office Action—U.S. Appl. No. 11/774,423.
Nov. 4, 2009 U.S. Office Action—U.S. Appl. No. 11/774,423.
Oct. 1, 2009 U.S. Office Action—U.S. Appl. No. 11/774,409.
Sep. 10, 2009—U.S. Advisory Action—U.S. Appl. No. 11/774,423.
Dec. 6, 2010 U.S. Final Office Action—U.S. Appl. No. 11/774,423.
May 17, 2010 U.S. Notice of Allowance—U.S. Appl. No. 11/551,595.
Sep. 7, 2010 U.S. Office Action—U.S. Appl. No. 11/774,423.
Mar. 10, 2010—U.S. Final Office Action—U.S. Appl. No. 11/774,423.
Feb. 15, 2011 U.S. Non-Final Office Action—U.S. Appl. No. 12/793,325.
Feb. 15, 2011 U.S. Office Action—U.S. Appl. No. 12/903,861.
Jul. 5, 2011 U.S. Notice of Allowance—U.S. Appl. No. 12/793,325.
Mar. 8, 2011 U.S. Office Action—U.S. Appl. No. 11/774,423.
Nov. 23, 2011 U.S.—Non-Final Office Action—U.S. Appl. No. 11/774,442.
Sep. 13, 2011 U.S. Final Office Action—U.S. Appl. No. 11/774,423.
Sep. 21, 2011 U.S. Office Action—U.S. Appl. No. 12/426,667.
Jul. 11, 2011 U.S. Notice of Allowance U.S. Appl. No. 12/903,861.
Aug. 30, 2012 U.S. Notice of Allowance—U.S. Appl. No. 13/353,232.
Dec. 21, 2012 U.S. Notice of Allowance—U.S. Appl. No. 13/353,218.
Dec. 21, 2012 U.S. Notice of Allowance—U.S. Appl. No. 13/353,232.
Jul. 10, 2012 U.S.—Notice of Allowance—U.S. Appl. No. 13/353,218.
Jun. 12, 2012 U.S. Final Office Action—U.S. Appl. No. 12/426,667.
Mar. 26, 2012 U.S. Office Action—U.S. Appl. No. 12/426,667.
May 18, 2012 U.S. Non-Final Office Action—U.S. Appl. No. 11/774,423.
May 21, 2012 U.S. Final Office Action—U.S. Appl. No. 11/774,442.
May 27, 2012 U.S. Supplemental Notice of Allowability—U.S. Appl. No. 11/551,595.
May 9, 2012 U.S. Notice of Allowance—U.S. Appl. No. 13/114,805.
Sep. 19, 2012 U.S. Final Office Action—U.S. Appl. No. 11/774,423.
Apr. 12, 2012 U.S. Office Action—U.S. Appl. No. 13/112,825.
Jan. 11, 2012—U.S. Office Action—U.S. Appl. No. 12/959,108.
May 11, 2012—U.S. Notice of Allowance U.S. Appl. No. 12/959,108.
Oct. 11, 2012—U.S. Notice of Allowance U.S. Appl. No. 13/112,825.
Aug. 28, 2013 U.S.—Non-Final Office Action—U.S. Appl. No. 13/730,079.
Feb. 14, 2013 U.S. Notice of Allowance—U.S. Appl. No. 13/112,825.
Feb. 15, 2013 U.S. Notice of Allowance—U.S. Appl. No. 13/353,218.
Feb. 20, 2013 U.S. Notice of Allowance—U.S. Appl. No. 13/353,232.
Jun. 4, 2013 U.S. Notice of Allowance—U.S. Appl. No. 13/353,232.
Jun. 5, 2013 U.S. Notice of allowance—U.S. Appl. No. 13/353,218.
May 6, 2013 U.S. Notice of Allowance—U.S. Appl. No. 13/353,218.
Nov. 20, 2013 U.S. Office Action—U.S. Appl. No. 13/905,957.
Oct. 15, 2013 U.S. Non-Final Office Action—U.S. Appl. No. 13/353,218.
Oct. 18, 2013 U.S. Non-Final Office Action—U.S. Appl. No. 14/018,913.

(56) References Cited

OTHER PUBLICATIONS

Nebraska State Filing Transmittal and Approval Notice. Allstate Insurance Company. Filing No. R14222. Date: Jun. 6, 2003.
Nebraska State Filing Transmittal and Approval Notice. Allstate Property and Casualty Insurance Company. Filing No. R14223. Date: Jun. 6, 2003.
New Dimensions in Personal Lines, Rough Notes Magazine Jan. 2004.
New Jersey Auto Endorsement Includes the text "AUT097-0104".
New Jersey Auto Insurance Buyer's Guide Includes the text "V411k (Jun. 2004), Auto 94 (Jun. 2004) Uniform".
New Jersey Coverage Selection Form Includes the text "AUT095-0704".
New Jersey Earthquake Insurance Availability Notice Includes the text "HOME 100 (Feb. 2003)".
New Jersey Endorsement Includes the text "AMP562C(OS/01)".
New Jersey Home Endorsement Includes the text "HOME69-Sep. 2003".
New Jersey Internal Appeals Procedure Includes the text "ATL 16-0606".
New Jersey Internal Appeals Procedure Includes the text "ATL16 0902".
New Jersey Internal Appeals Procedure Includes the text "PL296(Jan. 2002)".
New Jersey Notice Regarding Flood Damage Coverage Includes the text "HOME75-0902".
New Jersey Personal Injury Protection (PIP) Decision Point Review/Pre-Certification Plan Includes the text "PL 194A (Mar. 2001)".
New Jersey Personal Injury Protection Coverage Includes the text "Copyright, Insurance Services Office, Inc., 2003".
New Jersey Personal Injury Protection—Decision Point Review/Pre-Certification Plan Notice Includes the text "AUTO99-0902".
New Jersey Rating Information Form Includes the text "AUT096-0104".
New Jersey Skylands Auto Quick Reference Guide Produced in response to subpoena dated Feb. 5, 2013—date of document presumed to be earlier.
New Jersey Third Party Designation Notice Includes the text "ATL17-0902".
New Jersey Umbrella Coverage Include the text "AMP561 (Apr. 1999)".
New Jersey Umbrella Endorsement Includes the text "UMBRELLA13-0902".
New Jersey Uninsured Motorists Coverage—Single Limit Includes the text "AUTO 101 (0104)".
New Jersey Workers Compensation and Employers Liability Coverage for Residence Employees Endorsement Includes the text "AMP149A (Dec. 1999)".
New Jersey Workers' Compensation and Employers' Liability Insurance Includes the text "HOME72-0902".
New Jersey—Amendatory Cancellation and Nonrenewal Endorsement Includes the text "AMP4848 (Jan. 1997)".
New Price Quotes For Massachusetts Drivers Now Available From Liberty Mutual; Feb. 18, 2008; Liberty Mutual New Releases; [on-line], [attached copy retrieved on Jun. 4, 2008]. Retrieved from the internet: http://www.libertymutual.com/omapps/ContentServer?cid=1003349317278&prid=11383550083.
Niche Insurance Companies. Stewart Economics, Inc. 1997. http://www.stewarteconomics.com/Niches.pdf.
Notice Regarding Flood Damage Coverage—New Jersey Includes the text "PL 256 (Dec. 2000)".
Oregon Revised Rules "Date: Oct. 19, 2004"—Filing No. R15370; pp. 1-161.
Oregon Revised Rules and Rates "Date: Dec. 2, 2004"—Filing No. R15676; pp. 1-25.
Other Market News, (Publication Date Alleged by Nationwide—Oct. 2004) (includes text: "Copyright 2004 Commerce Publishing Company"); p. 1-2.
Overlooked Coverages can help round out homeowner's insurance, Carol Stuck, Pittsburgh Business Times, Aug. 12, 2006, 4 pages.
Passengers Stranded by Cruise Line Covered by Travel Insurance Policy, PR Newswire, p. 0912, Sep. 15, 2000, Dialog File 16.
Personal Injury Protection Coverage (Standard Personal Auto Policy)—New Jersey Includes the text "V475G(Jun. 2001)".
Personal Lines Manual—New Jersey Skylands Insurance Associates, Personal Auto Program—New Jersey; includes the text "Effective Date Jun. 6, 2007", "S001 04 06", "S1002 04 06".
Peterson, Brent—The Complete Idiot's Guide RVing, (Publication Date Alleged by Nationwide—2001); p. 1-2.
Philadelphia Insurance Companies Webpages. Jan. 23, 2002. http://web.archive.org/web/20020123150654/http://phly.com.
Pleasure Boat Insurance, printed from http://web.archive.org/web/20030806001648/http:/watercraft.progressive.com/pleas_bt_insrnc.asp. Aug. 6, 2003. (Exhibit B—1 page).
Policyholder Notice—Your Atlantic Master Plan is Different Please Read It Includes the text "AMP579 (May 2001)".
Problem Report Includes the text "Sent: Jan. 22, 2003".
Progressive Auto Product and Underwriting Guide, Sep. 30, 2004 Form No. 3200 (Sep. 2004) or Private Passenger Auto Program Copyright 2004 Progressive Casualty Insurance Company (Exhibit F—24 pages).
Progressive Casualty Insurance Co.—1994 Recreation Vehicle Form Filing in the State of Montana Mar. 1, 1994.
Progressive Casualty Insurance Co.—Rates & Forms Filing Transmittal documents in the State of Florida Feb. 5, 2003.
Progressive Insurance Co. The Place to Insure your Motorhome! [on-line] [retrieved on Oct. 20, 2012] Retrieved from the internet: <URL: http://www.epinions.com/review/finc-Insurance-All-Progressive_Group_-_Auto/finc-revi> (Publication Date Alleged by Nationwide—2001) (includes text: "Written: Oct. 24, 2000 (Updated Jan. 2, 2001)"), p. 1-2.
Progressive Insurance Co. The place to insure your Motorhome!, printed from http://www.epinions.com/review/finc-Insurance-All-Progressive_Group_-_Auto/finc-review, written Oct. 24, 2000, Updated Jan. 2, 2001. (Exhibit D—2 pages).
Progressive Northern Insurance Co.—Nov. 1999 Pleasure Boat Program Rates and Rules Filing in the State of Pennsylvania Feb. 17, 2000.
Progressive Watercraft Insurance Boat/ Personal Watercraft 2003-2004 Product Guide & Underwriting Guidelines, Form No. 3365 (Sep. 2002), Copyright 2003 Progressive Casualty Insurance Company, (Exhibit G—17 pages).
Progressive, Boat/Personal Watercode 2003-2004 Product Guide & Underwriting Guidelines, 17 pages.
Quote, Compare & Buy Auto Insurance—[on-line] [retrieved on Oct. 25, 2012] Retrieved from the internet: <URL: http://web.archive.org/web/20000304173417/http://progressive.com/icr/auto.cgi download Oct. 25, 2012> p. 1 (includes text: "Copyright 1995-2000").
Rate Quote Request. HART0000009-HART0000011.
Important Notice, "Deductible Savings Benefit—Your Policy Now Provides an Additional Benefit at No Extra Cost to You"—Metlife; includes the text "MPL 1833-000","Printed in USA Sep. 2001".
Important Notice, "Your Policy Now Provides an Additional Benefit at No Extra Cost to You" Deductible Savings Benefit—Metlife; includes the text "MPL 1833-000","Printed in USA Jul. 1999".
Insurance Companies Offer Discounts on Code Approved Windows and Doors Made With Impact Resistant Glass Solutia Inc.'s KeepSafe Maximum Meets Criteria; (Publication Date Alleged by Nationwide—Sep. 2004) (includes text: "Copyright 2004 PR Newswire"); p. 1-3.
Interviews with HO Claimants Pinpoint Needs, Roy C. McCormick, Rough Notes, Mar. 2002, 35 pages.
Introduction: Important Information About Your Personal Umbrella Policy Includes the text "UMBRELLA-0701".
Introduction: Important Information About Your Auto Policy Includes the text "AUTO-0701".
Introduction: Important Information About Your Home Policy Includes the text "HOME-0606".
Introduction: Important Information About Your Home Policy Includes the text "HOME-0801".
Icasisa (Jul. 7, 2004), Boat Insurance, message posted to Blue Water Board at http://2coolfishing.com/ttmboforum/showthread.php?t=2769. (Exhibit E—4 pages).

(56) References Cited

OTHER PUBLICATIONS

Johannes Mehring; Premium Rates in The German Motor Insurance Business; The Austin Bulletin; vol. III, Part 1, Dec. 1963; Dusseldorf, West Germany; pp. 13-19.
Joseph J. Muir—"Principles and Practices In Connection with Classification Rating Systems for Liability Insurance as Applied to Private Passenger Automobiles"; Proceedings of the Casualty Actuarial Society; May 23, 1957 and Nov. 21, 1957; pp. 19-44; vol. XLIV.
Josephson Gary R., et al. Crop-Hail Insurance Ratemaking: (Publication Date Alleged by Nationwide—1993) p. 155-201.
Kansas State Filing Transmittal and Approval Notice. Allstate Insurance Company. Filing No. R14198. Date: Jul. 14, 2003.
Keller, Wolfgang. Some Patterns for Insurance Systems. 1998. http://www.objectarchitects.de/ObjectArchitects/papers/Published/ZippedPapers/inspat03.pdf.
Kroll, Karen M., "Guaranteed-Replacement Coverage Fading Fast", Oct. 12, 2004, Bankrate.com, pp. 1-2.
Lee, Yoong-Sin, On the Representation of Loss and Indemnity Distributions (Publication Date Alleged by Nationwide—1990); p. 204-224 Mahul, Olivier, Optimal Insurance Design with Random Initial Wealth; (Publication Date Alleged by Nationwide—2000) (includes text: "Accepted on Jun. 15, 2000"); p. 1-6.
Lender's Loss Payable Endorsement Includes the text "HOME41-1298".
Lender's Loss Payable Endorsement Includes the text (rev. May 1, 1942).
Letter from State of Ohio Department of Insurance to American Modern Home Insurance Company re Leisure Guard Motor Home Program; Dated Aug. 1, 2001.
Letter, American Modern Home Insurance Company to Illinois Dept. of Insurance re Holiday Traveler Travel Trailer Program Forms Filing; Dated Jan. 31, 2000.
Letter, American Modern Home Insurance Company to Illinois Dept. of Insurance re Leisure Grand Motor Home Program Forms Filing; Dated Feb. 9, 2000.
Letter, American Modern Home Insurance Company to Ohio Dept. of Insurance re Holiday Traveler Travel Trailer Program Rate, Rule, Form Revisions; Dated Apr. 23, 2001.
Letter, American Modern Home Insurance Company to Ohio Dept. of Insurance re Holiday Traveler Travel Trailer Program Rate, Rule, Form Revisions; Dated May 22, 2001.
Letter, American Modern Home Insurance Company to Ohio Dept. of Insurance re Leisure Guard Motor Home Program Rate, Rule, Form Revisions; Dated Jul. 13, 2001.
Letter, American Modern Home Insurance Company to Ohio Dept. of Insurance re Leisure Guard Motor Home Program; Dated Aug. 27, 2001.
Letter, Metlife to Insurance Division for State of Rhode Island re Revisions of Private Passenger Automobile Program; Dated Jan. 9, 2001.
LexisNexis Financial News, MetLife Auto Home Unveils New Advertising Campaign; Snoopy(TM) Helps Convey "That All Auto Insurers are Not the Same" Aug. 3, 2000, http://www.prnewswire.com, Load date Aug. 4, 2000 (Exhibit B—2 pages).
Limited Coverage for Fungi, Wet or Dry Rot, or Bacteria Includes the text "HOME79-0902".
Long Term Care Insurance Policy Optional Benefits. Insurance Planners Website. Aug. 12, 2004. http://web.archive.org/web/20040812182952/http://www.long-term-care-insurance-planners.com/optional_benefits.html.
Loss of Use of Your Car Includes the text "Auto11-1298".
Loss Payable Clause Includes the text "AUT014-1298".
Low No Claims Bonus, [on-line], [attached copy retrieved on Dec. 7, 2007]. Retrieved from the internet: http://www.bell.co.uk/about_us.php.
Lowering the Cost of Your Auto Insurance, printed from http://web.archive.bibalex.org/web/20010626032349/http://www.safeco.com/safeco/insurance/auto/lowercost.asp. (Exhibit C—2 pages).

Mahul, Olivier, Optimal Insurance Design with Random Initial Wealth; (Publication Date Alleged by Nationwide—2000) (includes text: "Accepted on Jun. 15, 2000"); p. 1-6.
Marketing Bulletin, American Modern Insurance Group, Inc.—Rated A + (Superior) by A.M. Best, Dec. 21, 2001, (Exhibit B—1 page).
Martin Rosenberg, Rate Classification Reform in New Jersey, 1992), [on-line], [attach copy retrieved on Feb. 6, 2009]. Retrieved from the Internet http://www.faqs.org/abstracts/Insurance/London-Rate-classification-reform-in-New-Jersey.
Massachusetts Safe Driver Insurance Plan—Jan. 1, 2006; [on-line]. Retrieved from the internet: http:/fwww.mass.gov/Eoca/docs/doi!Legai_Hearings/211_134.PDF.
Massachusetts Safe Driver Insurance Plan. Jul. 19, 2008. Retrieved from [https://web.archive.org/web/20080719212350/http://www.mass.gov/Eoca/docs/doi/Legal_Hearings/211_134.PDF] on Jan. 8, 2014.
Memo. "Your Choice Auto Pricing." Nov. 1, 2003.
Metlife Auto & Home radio advertisement script for Home Replacement Cost Guarantee; Dated Jun. 28, 2000.
Metlife listing of Deductible Savings Benefit approval and effective dates by state; Dated Jun. 28, 2000.
Metropolitan Group Property and Casualty Insurance Company—Automobile Insurance Declarations; Dated Jan. 4, 2011.
Michelle Andrews, Insurance Trade-Off: Reducing Premiums by Eliminting Expensive Doctors, http://www.kaiserhealthnews.org/Features/Insuring-Your-Health/Michlle-Andrews-on-Premiums-and-Prices.aspx, Mar. 1, 2011, 2 pages, Washington, DC.
Monroe, Melissa. Auto Insurance Driving Down Costs. Many Policy Holdersignore ways to Reduce Premiums. San Antonio Express News. San Antonio Texas, Jan. 6, 2003. p. 01.L.
Mutual Benefit Group, "Homeowners/Renters Insurance: The security system you can't afford to overlook," Apr. 3, 2004, http://mutualbenefitgroup.com/products_home.html.
Mutual Policy Conditions Includes the text "ATL1-0101".
Nationwide Auto Insurance For Maximum Protection and Value; Retrieved from the internet: <URL: http://web.archive.org/web/19980523213338/http://www.nationwide.com/nationwide/prod . . . (includes text: "Copyright 1996-1998 Nationwide Mutual Insurance Company").
Nationwide Insurance Agency Locator—Retrieved from the internet: <URL: http://web.archive.org/27web/19970714135530/http://www.nationwide.com/nationwide/locat . . . (includes text: "Copyright 1997 Nationwide Insurance Enterprise").
Nationwide Insurance Agency Locator; Retrieved from the internet: <URL: http://web.archive.org/30web/19980523213311/http://www.nationwide.com/nationwide/locat . . . (includes text: "Copyright 1996-1998 Nationwide Mutual Insurance Company").
Nationwide Insurance Banner; Retrieved from the internet: <URL: http://web.archive.org/web/19970714132736fw_/http://www.nationwide.com/main.html—(includes text: "Copyright 1996, 1997 Nationwide Mutual Insurance Company").
Jul. 26, 2019—U.S. Final Office Action—U.S. Appl. No. 14/671,551.
Jun. 3, 2016—U.S. Final Office Action—U.S. Appl. No. 13/730,079.
Mar. 21, 2016—U.S. Final Office Action—U.S. Appl. No. 11/774,423.
Mar. 21, 2016—U.S. Non-Final Office Action—U.S. Appl. No. 14/018,913.
Mar. 23, 2016 U.S. Non-Final Office Action—U.S. Appl. No. 14/060,326.
May 4, 2016 U.S. Final Office Action—U.S. Appl. No. 14/501,287.
May 12, 2016 U.S. Final Office Action—U.S. Appl. No. 14/501,282.
May 18, 2016 U.S. Final Office Action—U.S. Appl. No. 13/905,957.
Nov. 2, 2016—U.S. Non-Final Office Action—U.S. Appl. No. 14/060,326.
Nov. 21, 2016 U.S. Final Office Action—U.S. Appl. No. 11/774,423.
Oct. 19, 2016 U.S. Final Office Action—U.S. Appl. No. 13/353,218.
Oct. 4, 2016 U.S. Non-Final Office Action—U.S. Appl. No. 14/501,282.
Oct. 5, 2016 U.S. Non-Final Office Action—U.S. Appl. No. 14/501,287.
Sep. 8, 2016 U.S. Final Office Action—U.S. Appl. No. 14/018,913.
Sep. 6, 2016 U.S. Non-Final Office Action—U.S. Appl. No. 14/139,048.
Sep. 29, 2016—U.S. Appl. No. 14/311,046—Non-Final Office Action.
Aug. 23, 2017 U.S. Final Office Action—U.S. Appl. No. 13/278,432.

(56) References Cited

OTHER PUBLICATIONS

Dec. 26, 2017 —U.S. Non-Final Office Action—U.S. Appl. No. 11/774,423.
Feb. 10 2017—U.S. Non-Final Office Action—U.S. Appl. No. 13/353,218.
Feb. 24, 2017—U.S. Final Office Action—U.S. Appl. No. 13/112,825.
Feb. 24, 2017—U.S. Final Office Action—U.S. Appl. No. 14/501,282.
Jan. 12, 2017—U.S. Final Office Action—U.S. Appl. No. 14/311,046.
Jan. 18, 2017—U.S. Non-Final Office Action—U.S. Appl. No. 13/278,432.
Jan. 20, 2017—U.S. Non-Final Office Action—U.S. Appl. No. 14/018,913.
Jan. 30, 2017—U.S. Non-Final Office Action—U.S. Appl. No. 14/501,266.
Jul. 25, 2017—U.S. Final Office Action—U.S. Appl. No. 12/426,667.
Jul. 31, 2017—U.S. Final Office Action—U.S. Appl. No. 11/774,423.
Jun. 7, 2017—U.S. Non-Final Office Action—U.S. Appl. No. 11/774,442.
Mar. 24, 2017—U.S. Final Office Action—U.S. Appl. No. 14/501,287.
Mar. 28, 2017—U.S. Non-Final Office Action—U.S. Appl. No. 11/774,423.
Oct. 18, 2017—U.S. Final Office Action—U.S. Appl. No. 11/774,442.
Sep. 12, 2017 U.S. Notice of Allowance—U.S. Appl. No. 14/060,326.
Sep. 12, 2017 U.S. Notice of Allowance—U.S. Appl. No. 14/139,048.
Jan. 4, 2018—U.S. Non-Final Office Action—U.S. Appl. No. 13/278,432.
Jun. 11, 2018—U.S. Final Office Action—U.S. Appl. No. 11/774,423.
Jun. 21, 2018—U.S. Notice of Allowance—U.S. Appl. No. 13/278,432.
Sep. 24, 2018—U.S. Non-Final Office Action—U.S. Appl. No. 11/774,423.
Jan. 17, 2019—U.S. Notice of Allowance—U.S. Appl. No. 13/278,432.
Jan. 7, 2019—U.S. Non-Final Office Action—U.S. Appl. No. 14/671,551.
A Directory of Markets for Truck Insurance; (Publication Date Alleged by Nationwide—Oct. 2003) (includes text:25 "Copyright 2003 ProQuest Information and Learning Company"); p. 1-10.
A PPO For Auto Work, (Publication Date Alleged by Nationwide—Aug. 1995) (includes text: "Copyright (1995) State-Record Co. (Columbia, SC)"); p. 1-2.
Additional Interest—Part II: Your Liability Coverage Includes the text "AUT012-0199".
Additional Interest—Part III Your Liability Coverage Includes the text "AMP89B (Dec. 1998)".
Advocating Mileage-Based Auto Insurance (Spring 2002). [on-line], [attached copy retrieved on Jan. 22, 2009]. Retrieved from the internet: http://www.clf.org/general/index.asp?.id=49.
Agreed Value Boat Coverage Includes the text "AMP583 (Jun. 2001)".
Ajit Chaudhari. Safe-T-Net Traffic Safety Design Chaudhari, et al. Oct. 20, 1997. [on-line], [attached copy retrieved on Dec. 7, 2007]. Retrieved from the internet: http:captology.stanford.edu/resources/designs/project2/safetnet.html.
Allied Extra Coverages p. 1-2 (includes text: "AA 0008 (Feb. 2007)").
Allstate Choice Auto Insurance. [on-line] [attached copy retrieved on Feb. 6, 2009]. Retrieved from the internet http://www.allstate.com/auto-insurance/auto-insurance-features.aspx.
Allstate Corporation; Rules Manual; Implementation Date: Dec. 13, 2004; pp. 58-1-58-4; Wisconsin Department of Insurance; Wisconsin, USA.
Allstate Corporation; Rules Manual; Implementation Date: Dec. 13, 2004; pp. 59-1-59-2; Wisconsin Department of Insurance; Wisconsin, USA.
Allstate Corporation; Rules Manual; Implementation Date: Dec. 6, 2004; p. 55-1; Oregon Department of Insurance; Oregon, USA.
Atlantic Master Plan—Added Coverage, Atlantic Mutual Insurance Company; includes the text "AMP 161 (Jul. 1986)".
Atlantic Master Plan—Additional Insured-Residence Coverage, Atlantic Mutual Insurance Company; includes the text "AMP 32A (Jan. 1983)".
Atlantic Master Plan—Additional Interest—Part III Your Liability Coverage, Atlantic Mutual Insurance Company; includes the text "AMP 89 (Dec. 1984)".
Atlantic Master Plan—Business Pursuits, Atlantic Mutual Insurance Company; includes the text "AMP 86 (Dec. 1984)".
Atlantic Master Plan—Camping Equipment Endorsement, Atlantic Mutual Insurance Company; includes the text "AMP 210 (Dec. 1987)".
Atlantic Master Plan—Condominium Renter to Others, Atlantic Mutual Insurance Company; includes the text "AMP 29 (Jan. 1983)".
Atlantic Master Plan—Corporate Cars, Atlantic Mutual Insurance Company; includes the text "AMP 159 (Jul. 1986)".
Atlantic Master Plan—Coverage for Recordings, Atlantic Mutual Insurance Company; includes the text "AMP 103 (Jan. 1983)".
Atlantic Master Plan—Credit for Existing Insurance Endorsement, Atlantic Mutual Insurance Company; includes the text "AMP 44 (Jan. 1983)".
Atlantic Master Plan—Deductible Reserve Fund, Atlantic Mutual Insurance Company; includes the text "AMP 158 (Dec. 1985)".
Atlantic Master Plan—Eathquake, Atlantic Mutual Insurance Company; includes the text "AMP 36B (Jul. 1987)".
Atlantic Master Plan—Forms Portfolio May 1988, Atlantic Mutual Insurance Company; includes the text "AMP 1D (May 1988)".
Atlantic Master Plan—Full Coverage for Safety Glass, Atlantic Mutual Insurance Company; includes the text "AMP 102 (Jan. 1983)".
Atlantic Master Plan—Incidental Farming Personal Liability, Atlantic Mutual Insurance Company; includes the text "AMP 40 (Jun. 1983)".
Atlantic Master Plan—Loss Assessment Coverage for Earthquake, Atlantic Mutual Insurance Company; includes the text "AMP 26A (Dec. 1985)".
Atlantic Master Plan—Loss of Use of Your Car, Atlantic Mutual Insurance Company; includes the text "AMP 82 (Dec. 1984)".
Atlantic Master Plan—Named Peril Contents Coverage, Atlantic Mutual Insurance Company; includes the text "AMP 164 (Jul. 1986)".
Atlantic Master Plan—Office, Professional, Private School or Studio Use—Other Residence, Atlantic Mutual Insurance Company; includes the text "AMP 34A (Jan. 1983)".
Atlantic Master Plan—Office, Professional, Private School or Studio Use—Other Structures, Atlantic Mutual Insurance Company; includes the text "AMP 33B (Dec. 1984)".
Atlantic Master Plan—Personal Home Computer, Atlantic Mutual Insurance Company; includes the text "AMP 45A (Dec. 1984)".
Atlantic Master Plan—Policy Holder Portfolio Includes the text "AMPA9 (Jul. 1996)".
Atlantic Master Plan—Replacement Cost for Your Cars, Atlantic Mutual Insurance Company; includes the text "AMP 101 (Jan. 1983)".
Atlantic Master Plan—Sound Equipment, Atlantic Mutual Insurance Company; includes the text "AMP 83 (Dec. 1984)".
Atlantic Master Plan—Unattached Structures Renter to Others, Atlantic Mutual Insurance Company; includes the text "AMP 31 (Jan. 1983)".
Atlantic Master Plan—Water Back Up of Sewers or Drains, Atlantic Mutual Insurance Company; includes the text "AMP 42A (Dec. 1984)".
Atlantic Master Plan—Watercraft, Atlantic Mutual Insurance Company; includes the text "AMP 87 (Dec. 1984)".
Atlantic Mutual Companies—Notice of Insurance Information Practices Includes the text "ATL12-0401".
Atlantic Mutual Companies—Notice of Insurance Information Practices Includes the text "PL258 (Apr. 2001)".
Atlantic Mutual Reduces Deductibles by 10% Each Year for Home, Auto Customers; Innovative Program Rewards Claim-Free Homeowners and Drivers; (Publication Date Alleged by Nationwide—Jul. 2004) (includes text: "Copyright 2004 PR Newswire Association, Inc,"); p. 1-2.
Auto Deductible Reserve—Collision Coverage Includes the text "AUT083-0802".

(56) References Cited

OTHER PUBLICATIONS

Auto Deductible Reserve—Comprehensive Coverage Includes the text "AUT082-0802".
Auto Insurance Quote Request; Retrieved from the internet: <URL: http:/lweb.archive.org/web/19980523213305/http:/1www.nationwide.com/nationwide/prod. (includes text: "Copyright 1996-1998 Nationwide Mutual Insurance Company").
Auto Insurance, printed from http://web.archive.org/web/20010602142723/http://www.safeco.com/safeco/Insurance/Auto. (Exhibit D—4 pages).
Automobile Insurance Consumer Bill of Rights Includes the text "Auto 187 (Jun. 2004) UNIFORM".
Background—Universal Auto vs. Allstate® Your Choice Auto. Jun. 22, 2004.
Baldwin, Ben G. The Complete Book of Insurance: The Consumer's Guide to Insuring your Life, Health Property, and Income. Illinois (Publication Date Alleged by Nationwide—1996) (includes text: "Copyright Ben G. Baldwin, 1989, 1991 and 1996") p. 1-26.
Ben Jacklet; Pay as you drive' policies get boost; Portland Tribune Jan. 10, 2003; [on-line], [attached copy retrieved on Dec. 7, 2007]. Retrieved from Internet: http://www.portlanddtribune.com/news/story.php?story_id=15889.
Bhuyan, Laxmi N., "Parallell Processing Architectures," retrieved from http://www.cs.ucr.edu/-bhuyan, 23 pages.
Blue Water Links—[on-line] [retrieved on Oct. 30, 2012] Retrieved from the internet: <URL: <http://2coolfishing.com/ttmbforum/showthread.php?=2769> (Publication Date Alleged by Nationwide—Jul. 2004) (includes text: "Jul. 7, 2004"), p. 1-4.
BNO's Bulletin Board System: Bus Conversion Insurance; [on-line] [retrieved on Nov. 26, 2012]. Retrieved from the internet: <URL: http://www.busnut.com/bbs/messages/233/6472.html?1 089775175> p. 1-3 (Publication Date Alleged by Nationwide—2004) (includes text: "Posted on Sunday, Jun. 27, 2004").
Boat/Personal Watercraft 2003/2004 Product Guide & Underwriting Guidelines—(includes text: "Copyright 2003 Progressive Casualty Insurance Company") p. 1-17.
Boone, Elisabeth, The Hartford Dimensions Plan Tracks Insureds Through Their Driving Lifetime, Retrieved from the internet: <URL: http://dialogweb.com/cgi/dwclient?req=1344540724699> (Publication Date Alleged by Nationwide—2004) (includes text: "Thursday, Jan. 1, 2004"); p. 1-6.
Brochure, American Modern Insurance Group, Inc. "Hit the Open Road and Leave the Worry Behind" Recreational Vehicle Insurance Coverage; includes the text "© American Modern Insurance Group 2004".
Car Insurance Rates and Accidents; copyright 1995-2008 [on-line], [attached copy retrieved on May 23, 2008]. Retrieved from the Internet: http://auto.progressive.com/progressive-car-insurance/accident-forgiveness.aspx.
Carving a Niche in The Mature Market by John H. Lafayette, Best's Review includes the text ". . . Hanover Insurance Group and could expand its marketing to as many as 10 states by year-end 1984 . . . " and the text "The development of Mature Outlook was in the serious planning staged through most of 1983 . . . ".
Charles L. McClenahan "Principles of Ratemaking" Dec. 31, 1987.
Charoen Kitti Kanya; Customers Hold All the Aces;—Bangkokpost 1999 Economic Review. [on-line], [attached copy retrieved on Dec. 7, 2007]. Retrieved from Internet: http://www.bangkokpost.com/99year-end/16insurance.htm.
Cheers & Jeers Editorial: Ashcroft, scams, Smokeout; (Publication Date Alleged by Nationwide—Nov. 2004) (includes text: "Copyright 2004 The Journal Gazette"); p. 1-2.
College Student Risks and Insurance Needs, Roy C. McCormick, Rough Notes, Oct. 2003.
Colorado State Filing Transmittal and Approval Notice. Allstate Insurance Company. Filing No. R14728. Date: Nov. 5, 2003.
Apr. 13, 2020—U.S. Final Office Action—U.S. Appl. No. 14/501,287.
May 14, 2020—U.S. Non-Final Office Action—U.S. Appl. No. 14/671,551.
Jul. 16, 2020—U.S. Non-Final Office Action—U.S. Appl. No. 16/220,252.
Coming Home to Personal-Lines Insurance by Robert A. Lanna, American Agent & Broker; Dated Apr. 1998.
Corvel—Information Sheet: Overview of the Provisions of the NJ Automobile Insurance Cost Reduction Act Includes the text "Aut099-0606/PL 194B (Jun. 2006)".
Corvel—Information Sheet: Overview of the Provisions of the NJ Automobile Insurance Cost Reduction Act Includes the text "Aut099-0904IPL 1948 (Sep. 2004)".
Countrywide Insurance Group—Your Privacy At Countrywide Insurance Group Includes the text "Corporate Privacy Policy Notice Effective Date: Dec. 2004".
Coverage Selection Form Includes the text "AMP270a (Oct. 1999)".
D'Alesio—Tretle Insurance Services, www.dtins.com, retrieved from web.archive.org, auto.html (Jun. 21, 2003), auto-xtras.html (Oct. 29, 2003).
Daid Yin,Hai-Tao—Risk-Based Pricing and Risk Prevention: Does the Private Insurance Market Help Reduce Underground Storage Tank (UST) Release Rates? (Publication Date Alleged by Nationwide—Nov. 2005) (includes text: "Copyright 2005 by Hai-Tao David Yin,"); p. 1-54.
Deductibles Endorsement—Part D, Coverage for Damage to Your Motor Home, American Modern Insurance Group, Inc.; includes the text "V8551 Oct. 1998".
Deductibles Endorsement—Part D, Coverage for Damage to Your Travel Trailer, American Modern Insurance Group, Inc.; includes the text "V855T Oct. 1998".
Disappearing Deductible Clause—p. 1 (includes text: "(Ed. May 1977)").
Disappearing Deductible Clause, Form No. CF 03 45 (Ed. May 1977). (Exhibit B—1 page).
Disposition Report Includes the text "Sent: Apr. 29, 2003".
Driver Exclusion Endorsement; includes the text "VRD00 (Feb. 2004)".
Driver Exclusion Endorsement; includes the text "VRD34 (Aug. 2004)".
Driver Exclusion Endorsement; includes the text "VTD00 (Apr. 2004)".
Drowsy Driver Deterent Project—Nov. 2, 1998, The Association for Automobile Safety and Accident Prevention. [attached copy retrieved on Dec. 7, 2007]. Retrieved from the internet: http://cmgm.standford.edu~pbrutlag/portfolio/ddd/index.html.
Electric Insurance Company—Brochure on Rewards for Club Memberships.
Electric Insurance Company—Brochure on Safe Drivers Yield Big Rewards.
Electric Insurance Company—Letter to Customer re Preferred Customer Club includes the text "PCC-REN-0402".
Electric Insurance Company—Preferred Customer Club—Great Rewards for Exceptional Driver includes the text "PCC-OVER-0102".
Electric Insurance Company—Web screen shots from EIC website regarding insurance quote includes the text "PCC-OVER-0102".
Email from American Modern Home Insurance Company to Ohio Dept. of Insurance re proposal to amend effective; date Includes the text "propose to amend the effective date to Dec. 1, 2001 for new business and Jan. 1, 2002 for renewals".
Email. "FW: Msmt Needs for Your Choice Auto—Northeast." Sent May 11, 2004.
Email. "FW: Your Choice Auto—Product Cluster and Strategy Development." Sent. Oct. 21, 2003.
Enhanced Coverage Endorsement Includes the text "AMP556A (OS/01)".
Enhanced Value Endorsement—Disappearing Collision Deductible—includes: Transmittal Header, Form Filing Transmittal, Explanatory Memorandum and Cover letter; (Publication Date Alleged by Nationwide—2003) (includes text: "Filing date: Jul. 29, 2003"); p. 1-9.
Epinions, Progressive Group—Auto Review, dated Jan. 2, 2001, pp. 1-4.
Explanatory Memorandum re Ohio Motor Home Program Changes, American Modern Home Insurance; Includes the text "We propose an effective date of Oct. 1, 2001".

(56) References Cited

OTHER PUBLICATIONS

Explanatory Memorandum re Ohio Travel Trailer Program Changes, American Modern Home Insurance; Includes the text "We propose an effective date of Jul. 1, 2001".
Fairhall, John, "Accidents don't always raise insurance rate," The Courier, Jan. 1, 1984, p. 2C.
Feng, et al., "New Transistor Laser Could Lead to Faster Signal Processing", Nov. 29, 2004, Science Daily, 2 pages.
Filing Notice, State of Ohio Department of Insurance for American Modern Home Insurance Company—Holiday Travel Trailer; Includes the text "Effective Date: Jul. 1, 2001".
Filing Notice, State of Ohio Department of Insurance for American Modern Home Insurance Company—Leisure Guard Rate Rule Form; Includes the text "Effective Date: Oct. 1, 2001".
Filing Notice, State of Ohio Department of Insurance for American Modern Home Insurance Company—Leisure Guard Rate Rule Form; Includes the text "Effective Date: Dec. 1, 2001".
Finding the Right Insurance, Paraplegia News Magazine Nov. 2000.
Finefrock, Don—Shutters May Mean Insurance Discounts: (Publication Date Alleged by Nationwide—Jul. 1994) (Incudes text: Copyright ? 2004, The Miami Herald . . . Jun. 16, 1994), p. 1-2.
Fishing Boat Insurance, printed from http:l/web.archive.org/web/20030805201708/http:/watercraft.progressive.com/fish_bt_insrnc.asp. Aug. 5, 2003. (Exhibit C—2 pages).
Form Filing—Private Passenger Auto—File No. L030020-A Includes the text "Feb. 18, 2003".
Form Filing—Private Passenger Auto—File No. L030020-A Includes the text "Jan. 29, 2003".
Form Filing—Private Passenger Auto—File No. L030020-A Includes the text "Sent: Jan. 10, 2003".
Goldmine Insurance Case Study. 2004. http://www.frontrange.com/common/Files/Downloads/Case_Studies/SMRM_Casestudies/SMRM_GoldMine_ CaseStudyRAandRInusance_NA_EN.pdf.
Good Driver Car Insurance Rewards Safe Driving. [on-line], [attached copy retrieved on Feb. 6, 2009]. Retrieved from internet:http://www.insureme.com/content/rsrc/auto/good-driver-car-insurance.
GTCC Offers Health Insurance Seminar, (Publication Date Alleged by Nationwide—Jan. 1991) (includes text: "Copyright 1991 2001 Greensboro News & Record"); p. 1-2.
Henderson, Daniel J., Leisure Guard Motor Home Now Available in Connecticut—Marketing Bulletin (Publication Date Alleged by Nationwide—2001)—(includes text: "Dec. 21, 2001") p. 1.
High Point, N.C.—Area Homeowners Weigh Filing Policies in Wake of Storm published on Dec. 16, 2002 in High Point Enterprise—from Knight-Ridder Tribune Business News. From Dialog File 20 (Dialog Global Reporter) (Dialog ID No. 26630651).
Home Deductible Reserve Includes the text "HOME56-0802".
Howard, J.D., "Auto Insurance Claims—General", Apr. 13, 2004, URL: http://ican2000.com/ussetauto.html, pp. 1-6.
Ian Ayres, Make Car Insurance Fairer; and Barry Nalebuff; Mar. 17, 2003; vol. 171: Issue 06; Forbes Magazine—Copyright 2003 Forbes, Inc.
Idaho Allstate Your Choice Auto ALSTAR Enhancements. 2003.
Idaho Your Choice Auto. Jul. 2003.
Sep. 2, 2020 —U.S. Notice of Allowance—U.S. Appl. No. 14/501,287.
Sep. 18, 2020—U.S. Non-Final Office Action—U.S. Appl. No. 15/838,179.
Sep. 24, 2020—U.S. Non-Final Office Action—U.S. Appl. No. 12/426,667.
Nov. 9, 2020—U.S. Final Office Action—U.S. Appl. No. 16/220,252.
Nov. 13, 2020—U.S. Final Office Action—U.S. Appl. No. 14/671,551.
Nov. 26, 2019—U.S. Final Office Action—U.S. Appl. No. 11/774,423.
Allstate Corporation; Rules Manual; Implementation Date: Dec. 6, 2004; pp. 22-1-22-10; Oregon Department of Insurance; Oregon, USA.
Allstate Corporation; Rules Manual; Implementation Date: Dec. 6, 2004; pp. 54-1-54-2; Oregon Department of Insurance; Oregon, USA.
Allstate Corporation; Rules Manual; Implementation Date: Feb. 26, 2001; p. HO26-1; Mississippi Department of Insurance; Mississippi, USA.
Allstate Corporation; Rules Manual; Implementation Date: Jan. 3, 2000; pp. 22-1-22-8; Colorado Department of Insurance; Colorado, USA.
Allstate Corporation; Rules Manual; Implementation Date: Jul. 31, 2000; pp. HO23-1-HO23-2; Missouri Department of Insurance; Missouri, USA.
Allstate Corporation; Rules Manual; Implementation Date: Mar. 6, 2006; p. HOPC26-1; Idaho Department of Insurance; Idaho, USA.
Allstate Corporation; Rules Manual; Implementation Date: Mar. 6, 2006; p. HOPC36-1; Idaho Department of Insurance; Idaho, USA.
Allstate Corporation; Rules Manual; Implementation Date: Mar. 6, 2006; p. HOPC37-1; Idaho Department of Insurance; Idaho, USA.
Allstate Corporation; Rules Manual; Implementation Date: Nov. 3, 2003; p. HOPC26-1; Colorado Department of Insurance; Colorado, USA.
Allstate Corporation; Rules Manual; Implementation Date: Oct. 31, 2005; pp. 59-1-59-3; Indiana Department of Insurance; Indiana, USA.
Allstate Corporation; Rules Manual; Implementation Dates: Aug. 11, 1997 and Jun. 7, 1999 ; pp. 36-40; Maine Department of Insurance; Maine, USA.
Allstate Corporation; Rules Manual; Implementation Dates: Aug. 28, 1989 and Nov. 16, 1992; pp. 11-16; Wisconsin Department of Insurance; Wisconsin, USA.
Allstate Your Choice Auto 2003. 2003.
Amendment of Policy Provisions Physical Damage Coverages—New Jersey Includes the text "V571 (Ed Jun. 1991)".
American Modern Home Holiday Traveler Travel Trailer Program—Illinois; includes the text "V8TIL—Effective Date Jul. 1, 2003—Publication Date Mar. 18, 2013" [sic].
American Modern Home Holiday Traveler Travel Trailer Program—Ohio, Forms List; includes the text "V8TOH—Effective Date Feb. 1, 2002—Publication Date Oct. 23, 2001".
American Modern Home Holiday Traveler Travel Trailer Program; includes the text "V8TOH—Effective Date Jul. 1, 2001—Publication Date Mar. 6, 2001".
American Modern Home Insurance Company (077) Illinois Holiday Traveler Travel Trailer Application; includes the text "V6TIL (Jul. 2003)" and "© American Modern Insurance Group 2003".
American Modern Home Insurance Company (077) Illinois Holiday Traveler Travel Trailer Application; includes the text "V6TIL (Aug. 2002)" and "© American Modern Insurance Group 2002".
American Modern Home Insurance Company (077) Illinois Motor Home Application; includes the text "V61-IL (Feb. 2004)" and "© American Modern Insurance Group 2004".
American Modern Home Insurance Company (077) Illinois Motor Home Application; includes the text "V61-IL (Jul. 2003)" and "© American Modern Insurance Group 2003".
American Modern Home Insurance Company (077) Illinois Motor Home Application; includes the text "V61-IL (Aug. 2002)" and "© American Modern Insurance Group 2004".
American Modern Home Insurance Company (077) Illinois Motor Home Application; includes the text "V61-IL (Aug. 2004)" and "© American Modern Insurance Group 2004".
American Modern Home Insurance Company (077) Illinois Travel Trailer Application; includes the text "VT6IL (Aug. 2004)" and "© American Modern Insurance Group 2004".
American Modern Home Insurance Company (077) Ohio Leisure Guard Motor Home Application; includes the text "V61-OH (Dec. 2003)" and "© American Modern Insurance Group 2003".
American Modern Home Insurance Company (077) Ohio Motor Home Application; includes the text "V61-OH (Feb. 2004)" and "© American Modern Insurance Group 2004".
American Modern Home Insurance Company (077) Ohio Motor Home Application; includes the text "V61-OH (Jul. 2004)" and "© American Modern Insurance Group 2004".
American Modern Home Insurance Company (077) Ohio Motor Home Application; includes the text "V61-OH (Oct. 2001)" and "© American Modern Insurance Group 2001".

(56) References Cited

OTHER PUBLICATIONS

American Modern Home Insurance Company Illinois Motor Home Application; includes the text "V61-IL (Apr. 2000)" and "© American Modern Insurance Group 2004".

American Modern Home Leisure Guard Motor Home Program—Illinois; includes the text "V80IL—Effective Date Jul. 1, 2002—Publication Date Mar. 18, 2013" [sic].

American Modern Home Leisure Guard Motor Home Program—Ohio, Forms List; includes the text "V80H—Effective Date Feb. 1, 2004—Publication Date Mar. 17, 2004".

American Modern Home Leisure Guard Motor Home Program—Ohio; includes the text "V80H—Effective Date Feb. 1, 2004—Publication Date Dec. 19, 2003".

American Modern Home Leisure Guard Motor Home Uninsured and Underinsured Motorists Coverage Selection Form; includes the text "V64-IL (Sep. 1995)".

American Modern Insurance Group, Inc. (077) Leisure Guard Program Motor Home Illinois—New Business May 15, 2000, Renewal Business Jun. 15, 2000; includes the text "V60IL (May 2000)"; "Copyright, Insurance Services Office, Inc., 1996".

American Modern Insurance Group, Inc. (077) Motor Home Rate and Rule Manual Illinois—New Business Jul. 1, 2003, Renewal Business Aug. 1, 2003; includes the text "VRMIL (Jul. 2003)"; "© American Modern Insurance Group 2003".

American Modern Insurance Group, Inc. (077) Motor Home Rate and Rule Manual Illinois—New Business Aug. 1, 2002, Renewal Business Sep. 1, 2002; includes the text "VRMIL (Aug. 2002)"; "© American Modern Insurance Group 2002".

American Modern Insurance Group, Inc. (077) Motor Home Rate and Rule Manual Ohio—New Business Feb. 1, 2004, Renewal Business Mar. 1, 2004; includes the text "VRMOH (Feb. 2004)"; "© American Modern Insurance Group 2004".

American Modern Insurance Group, Inc. (077) Motor Home Rate and Rule Manual Ohio—New Business Dec. 1, 2001, Renewal Business Jan. 1, 2002; includes the text "VRMOH (Dec. 2001)"; "© American Modern Insurance Group 2001".

American Modern Insurance Group, Inc. (077) Travel Trailer Rate and Rule Manual Illinois—New Business Jul. 1, 2003, Renewal Business Aug. 1, 2003; includes the text "VRTIL (Jul. 2003)"; "© American Modern Insurance Group 2003".

American Modern Insurance Group, Inc. (077) Travel Trailer Rate and Rule Manual Illinois—New Business Aug. 1, 2002, Renewal Business Sep. 1, 2002; includes the text "VRTIL (Aug. 2002)"; "© American Modern Insurance Group 2002".

American Modern Insurance Group, Inc. (077) Travel Trailer Rate and Rule Manual Ohio—New Business Feb. 1, 2004, Renewal Business Mar. 1, 2004; includes the text "VRTOH (Feb. 2004)"; "© American Modern Insurance Group 2004".

American Modern Insurance Group, Inc. (077) Travel Trailer Rate and Rule Manual Ohio—New Business Jul. 1, 2001, Renewal Business Aug. 1, 2001; includes the text "VRTOH (Jul. 2001)"; "© American Modern Insurance Group 2001".

American Modern Insurance Group, Inc. (077) Travel Trailer Rate and Rule Manual Ohio—New Business Nov. 1, 2002, Renewal Business Dec. 1, 2002; includes the text "VRTOH (Nov. 2002)"; "© American Modern Insurance Group 2002".

American Modern Insurance Group, Inc.—Offer of Uninsured/Underinsured Motorist Liability and Property Damage Coverage and Selection of Limits or Rejection of Coverage—Personal Lines (Ohio); includes the text "V64OH (Rev. Jul. 2001)".

American Modern Insurance Group, Inc.—Offer or Rejection of Uninsured/Underinsured Motorist Liability and Selection or Rejection of Property Damage Coverage (Ohio); includes the text "VM4OH (Jan. 2003)".

American Modern Insurance Group, Inc. Marketing Bulletin—Revised Ohio Leisure Guard Motor Home Program; Dated Nov. 14, 2001.

American Modern Insurance Group, Inc. Marketing Bulletin—Updates to Leisure Guard Motor Home Program in Illinois; Dated Jun. 24, 2002.

Anonymous—How Forgiving is your Auto Insurance? Changing Times (pre-1986); Nov. 1984; 38, 011; ABI/INFORM p. 42.

Application for Approval of Insurance Rates Filed L030020-A, Includes the text "Jan. 29, 2003 Date of Filing".

Atlantic Master Plan—$5000 Deductible Reserve Fund, Atlantic Mutual Insurance Company; includes the text "AMP 223 (May 1988)".

Oct. 1, 2019—U.S. Non-Final Office Action—U.S. Appl. No. 14/501,287.

Co-pending U.S. Appl. No. 11/270,611, inventor Floyd; Yager, filed Nov. 10, 2005.

Co-pending U.S. Appl. No. 11/551,609, inventor Floyd; Yager, filed Oct. 20, 2006.

Co-pending U.S. Appl. No. 11/774,409, inventor Floyd; Yager.

Co-pending U.S. Appl. No. 14/501,266, inventor Floyd; Yager, filed Sep. 30, 2014.

Co-pending U.S. Appl. No. 14/501,282, inventor Floyd; Yager, filed Sep. 30, 2014.

Nov. 29, 2021 U.S. Non-Final Office Action—U.S. Appl. No. 11/774,423, 20 Pages.

Oct. 6, 2021 U.S. Non-Final Office Action—U.S. Appl. No. 14/671,551, 8 Pages.

Austin, L. C. (1996). Consumer insurance decisions: An empirical analysis of four real-world decisions (Order No. 9713165). Available from ProQuest Dissertations and Theses Professional. (304239120). Retrieved from https://dialog.proquest.com/professional/docview/304239120?accountid=131444 (Year: 1996).

PROCESSING AN APPLICATION FOR INSURANCE COVERAGE

CROSS REFERENCE TO RELATED APPLICATIONS

This application is a continuation of U.S. patent application Ser. No. 13/905,957, filed May 30, 2013, and entitled "Processing an Application for Insurance Coverage," which is a continuation of U.S. patent application Ser. No. 13/112,825, filed May 20, 2011, and entitled "Processing an Application for Insurance Coverage," which is a continuation of U.S. patent application Ser. No. 12/959,108, filed Dec. 2, 2010, and entitled "Processing an Application for Insurance Coverage," and patented as U.S. Pat. No. 8,219,426, which is a continuation of Ser. No. 12/903,861, filed Oct. 13, 2010, and entitled "Processing an Application for Insurance Coverage," and patented as U.S. Pat. No. 8,046,246, which is a continuation of U.S. patent application Ser. No. 12/793,325, filed Jun. 3, 2010, and entitled "Systems and Methods for Customizing Insurance," and patented as U.S. Pat. No. 8,046,244, which is a continuation of U.S. patent application Ser. No. 11/551,595, filed Oct. 20, 2006, and entitled "Systems and Methods for Customizing Automobile Insurance" and patented as U.S. Pat. No. 7,774,271, which is a continuation-in-part of U.S. patent application Ser. No. 11/270,611, filed Nov. 10, 2005, and entitled "Systems and Methods for Customizing Insurance," which claims priority to U.S. Provisional Application No. 60/629,318, filed Nov. 19, 2004. The entire disclosures of each of the foregoing applications are hereby incorporated by reference herein in their entireties for all purposes.

TECHNICAL FIELD

Aspects described herein relate to systems and methods for customizing insurance and, more particularly, to customizing insurance policies according to consumer preferences. Aspects also provide systems and methods to design insurance products in a manner that allows consumers to select insurance packages that include features they consider appropriate for their needs.

BACKGROUND

Today's consumer is more pressed than ever for time. With increasing time demands placed, many consumers do not have much time to shop, and what time they do have seems to be consumed in reviewing the massive amount of information they encounter in shopping. The pressures attendant the time constraints and information can pervade a consumer's shopping experience, including shopping for insurance.

New technologies, however, now make possible aids to help consumers as they make insurance choices in much less time that they could years ago. The challenge is how to harness those technologies.

SUMMARY

Methods and systems are provided for creating insurance packages and providing insurance services. Insurance packages may be created by performing research to identify a target population and a set of insurance features desired by the target population. The set of insurance features may be bundled into an insurance package. The packages may include standard components, combinations of optimized components, optimized combinations of standard components and various combinations. The insurance packages may provide automobile insurance, homeowner's insurance and other types of insurance In certain embodiments of the invention, aspects of the present invention can be partially or wholly implemented with a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

All descriptions are exemplary and explanatory only and are not intended to restrict the invention, as claimed. The accompanying drawings, which are incorporated in and constitute a part of this specification, illustrate embodiments of the invention and, together with the description, serve to explain the principles of the invention. In the drawings:

DETAILED DESCRIPTION

Figure 1:
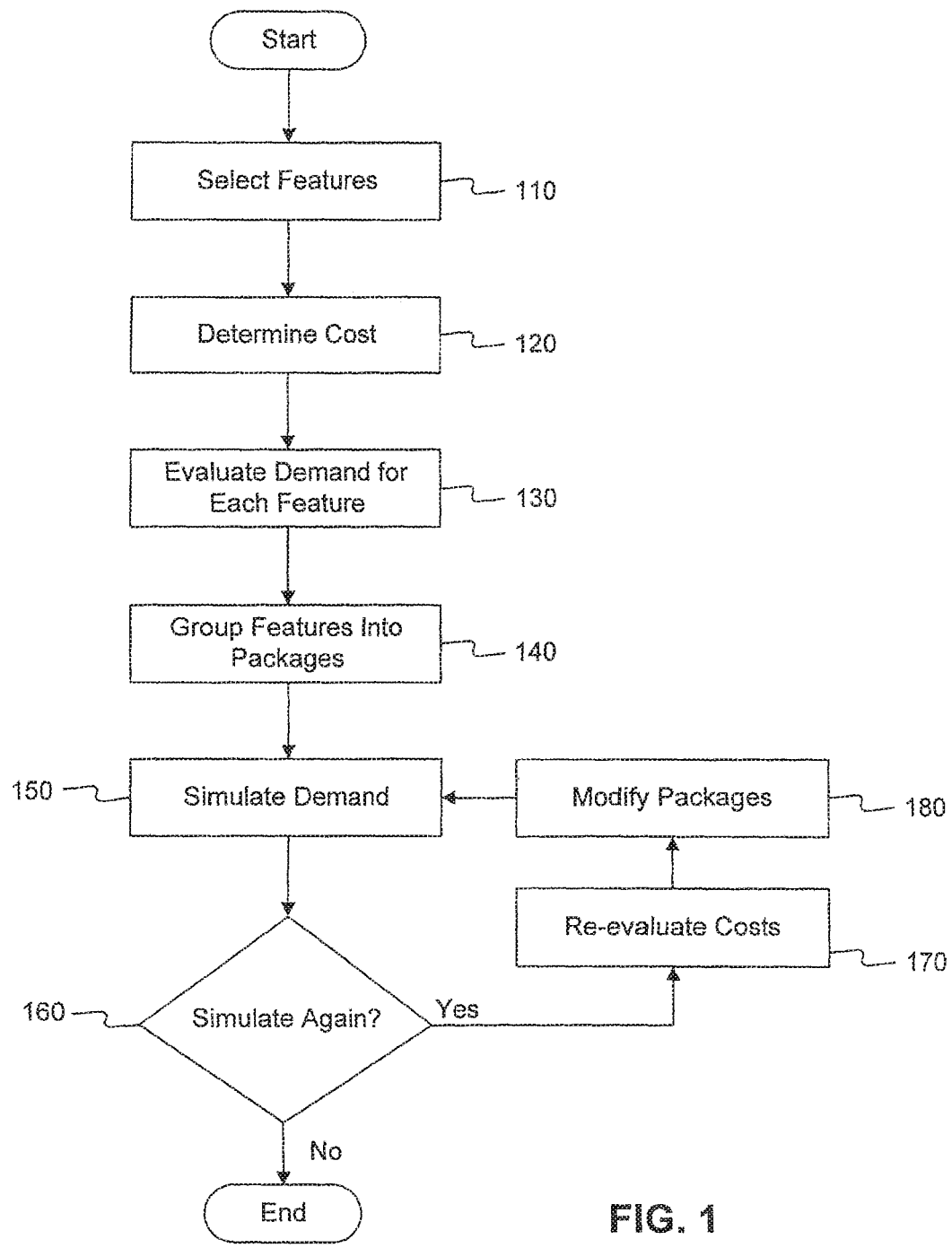
FIG. 1 is an exemplary flow chart for optimizing insurance products, in accordance with an embodiment of the invention.

Generally, insurance is an agreement by which an insurer, sometimes referred to as an underwriter, in exchange for consideration, undertakes to indemnify the insured party against loss, damage, or liability arising from certain risks. The consideration paid by an insured party is typically referred to as a premium, which is paid to keep the insurance in effect. In general, an insurance policy is a contract of insurance that defines the rights and duties of the contracting parties. A typical insurance policy includes limits on the amount of risk that the insurer will cover.

Systems and methods consistent with aspects of the present invention provide consumers with insurance products that may help them address some of their individual needs or wants by including features that a particular group may find desirable or appropriate. For the purposes of this application, features may include coverages, terms, and rewards. Generally, a coverage provides a protection or indemnification to the insured. A term includes any word, phrase, or provision of import that determines the nature and scope of an agreement, such as the coverage grant in an insurance coverage or the premium charged. A reward may include a discount, credit, or benefit provided to the insured upon the occurrence of a specified event.

When a feature is not included in a group, that particular feature is referred to as an ala carte feature. Ala carte features refer to coverages, terms, and rewards that are selected by the insured on an individual basis for inclusion in an insurance product.

Features may be grouped together to form a package. For example, one grouping may form a value package for price conscious consumers, another grouping may form a protection plus package providing additional features, and yet another grouping may form a platinum package including yet more additional features. An insurance product may also include a standard package that includes coverages required by state law, such as bodily injury liability coverage and property damage liability coverage. Coverages in a standard package may also include personal injury protection coverage, medical payment coverage, uninsured motorist coverage, underinsured motorist coverage, collision coverage, and comprehensive coverage.

Most states mandate minimum types and levels of automobile insurance coverage. For example, a state may require liability coverage with mandated minimum coverage limits. Depending upon the particular state, some common coverages may be mandatory or optional. Other coverages, such as collision and comprehensive, may be required by banks or financial institutions as a prerequisite to obtain vehicle financing.

In the marketplace today, an automobile insurance product offering might include standard coverages required by state law and/or financial institutions. A standard package includes coverages and coverage limits that meet minimum state law requirements. A standard package may also include other coverages that are required by financial institutions. Additionally, insurance companies may offer coverages and coverage limits that are not required by state law or by financial institutions. Coverage examples include towing reimbursement and car rental reimbursement.

Automobile insurance consumers find value in optional coverages designed around potential risks uniquely associated with driving and or repairing of vehicles. Some examples include towing and emergency repair coverage. A car rental reimbursement coverage may help pay for the use of a rented vehicle while the insured vehicle is being repaired due to a loss caused by a covered peril. Other personal coverages are also offered in the event certain covered perils occur.

The following provides a summary of an exemplary basic optimized package, two additional optimized packages, and various exemplary ala carte features that may be added by a consumer to one of the optimized packages. For example, a basic package might include a reduced premium by adding in a few terms. It is designed as an alternative for the customer particularly concerned about price. In particular, a customer may be required to participate in an arrangement that automatically makes periodic (for example, monthly) deductions from the insured's savings or checking account to pay the premium and other charges or fees associated with the insurance. Customers will be charged an early termination fee (such as $100) if the insurance is terminated by the insured, which might include the insured's failure to accept a renewal offer, or terminated for non-payment of premium, within a specified period of time after the package is added.

Another optimized package might offer an accident waiver enhancement feature and a safe driving deductible reward feature. The accident waiver enhancement feature might specify that the first rate-affecting accident that occurs will not cause the loss of certain discounts or result in the application of any accident surcharges. Subsequent rate affecting accidents will not cause the loss of the discounts or the application of any accident surcharges if the insured has not received this waiver in the thirty-six month experience period ending on the date of the accident. Similarly, a ticket forgiveness feature might specify that a ticket for a traffic violation will not cause the loss of certain discounts or result in a policy not being renewed.

The safe driving deductible reward feature might provide, upon enrollment, that the customer will receive an initial reduction (such as $100) in his or her collision deductible. For each twelve month experience period the policy is not assigned an accident, the insured will receive an additional reduction (up to a maximum $500 reduction) in their collision deductible that will apply to all covered collision claims during the next policy period.

Yet another optimized package might offer an accident waiver enhancement plus feature, a safe driving deductible reward feature, and a safe driving bonus feature. With the accident waiver enhancement plus feature, neither a single accident nor multiple accidents will cause the loss of certain discounts or the application of accident surcharges as long as the accidents occur while this feature is part of the policy. The safe driving bonus feature may provide if the policy is not assigned an accident for a designated six-month experience period, the insured will receive 5% of their previous term's premium for major coverages as a credit that can be applied toward the next six-month premium.

Both of the above-described exemplary optimized packages may also allow the customer the opportunity to add, for an additional premium, an additional feature in the form of a new car expanded protection coverage feature on an automobile that has collision and comprehensive coverages. The coverage provided by this feature will continue while collision and comprehensive coverages are maintained and will be removed at the first renewal that is effective in the calendar year that is three years greater than the auto's model year.

The new car expanded protection coverage feature may provide that, in the event of a covered loss to an automobile other than a total loss, the insurance carrier will pay to repair the auto without a deduction for depreciation. The repair coverage may not apply to losses caused by fire, theft, larceny, or flood. Furthermore, the amount payable will be reduced by any amounts paid or payable under the collision or comprehensive coverages as well as any applicable collision or comprehensive deductible.

The new car expanded protection coverage feature may also provide that, in the event of a covered total loss, the insurance carrier will pay to replace the automobile with a new one of the same make and model with the same equipment or, if a new automobile of the same make and model with the same equipment is not available, a new automobile that is similar in size, class, body type and equipment (subject to a price limitation described in the coverage). The replacement coverage may not apply to leased vehicles or to losses caused by fire, theft, larceny, or flood. Furthermore, the amount payable will be reduced by any amounts paid or payable under the collision or comprehensive coverages, any applicable collision or comprehensive deductible, and the dollar amount of any unrepaired damage that occurred prior to the total loss of the automobile.

The new car expanded protection coverage feature may also provide that, in the event of a covered total loss, if the amount the customer owes under the original automobile loan or automobile lease exceeds the actual cash value of the automobile at the time of loss, the insurance carrier will pay the difference between the amounts. The amount payable may be reduced by any overdue loan or lease payments (and any financial penalties associated with those overdue payments), the transfer or rollover of a previous outstanding loan or lease balance from another vehicle to the original loan or lease for the covered automobile, the dollar amount of unrepaired damage which occurred prior to the total loss, all refunds paid or payable to the customer as a result of the early termination of the automobile loan or automobile lease agreement (including financed warranty/extended service contracts), and any amount paid or payable under the replacement protection of the new car expanded coverage protection feature.

In forming the above exemplary packages that are offered for sale by an insurance carrier, one forming the package offerings might decide to consider consumer "need states" to group features into packages offered for sale. Need states refer to the complex web of rational and subconscious triggers that prompt a consumer to make a product selection. Need states may be prompted by a consumer deciding that he or she needs or wants to obtain a product. Furthermore, they are generally a result of an individual's situation at a particular point in time. Life stage events, such as a new driver in the family, shift consumers' need states. Of course, automobile insurance consumers may have varied circumstances, and consequently, differing insurance needs and wants. One may be a student with limited resources, and as a result, might select state mandated coverage. Another may be near retirement and focused on protection of assets and convenience of services.

Systems and methods consistent with aspects of the present invention identify distinct groupings of insurance consumers with similar need states and identify the most commonly desired optional features that consumers might chose to help meet their needs. Optional features are then combined by the system into optimized packages of insurance products that are offered for sale to consumers. By grouping features into packages that align with common need states, the offered products will be attractive to persons in need states that were considered when designing the packages.

An "optimized package" includes a set of insurance features that are packaged to help address the needs and wants of consumers in a particular grouping. Ala carte features may also be optimized. For example, ala carte features may be optimized by grouping certain ala carte features together that share an attribute. Accordingly, both optimized features and optimized ala carte features include coverages, terms, and rewards that are selected from a group that shares an attribute. The shared attribute allows the features to be grouped around a common theme. For example, a value grouping may include features designed around lower price. A protection theme may include features optimized around protecting assets. For the most part, features are grouped to share an attribute, however, features that are grouped around a common theme may also include one or more features that do not share the common theme or are based on a regional theme.

More than one package may be grouped together to form a "plan." A plan refers to a grouping of a standard package with at least one optimized package of features. A consumer may also add ala carte features, or optimized ala carte features, to a plan on an individual basis.

The process by which packages are designed may involve consideration of market theories. When looking to a market, one needs to identify the individuals that might decide to purchase a product. A group of persons that may be interested in or share a need for a particular product or products is defined as a target population. Accordingly, the target population is the group to be reached through some action or intervention and may refer to groups with specific characteristics.

Market segmentation refers to the process of grouping persons in a target population into smaller subgroups called market segments. A market segment is a group within a heterogeneous market consisting of consumers or organizations with relatively homogeneous needs and wants. Consumers in a market segment are expected to respond to a given set of marketing stimuli in a similar manner. Ideally, individuals within a market segment will likely have similar feelings about a marketing mix comprised of a given product, sold at a given price, distributed in a certain way, and promoted in a certain way. Accordingly, a market segment is a more specifically defined group within the target population.

A target population or a market segment may share one or more common characteristics that statistically describe the persons within the target population or market segment. Characteristics may include gender, age, occupation, marital status, and family size.

To select features that might appeal to a particular target population or market segment, features may be grouped together along marketing demand parameters. Groups of features are offered in different product structures, which are discussed in further detail below. Utility-based groupings maximize product acceptance of product packages by statistically predicting consumer demand based on multidimensional analysis of consumer motivations. These motivations are then compiled through a demand simulator to identify and target product requirements that may be attractive to various segments of the consumer population. A demand simulator measures overall demand potential as well as consumer preferences for various product features and brands. By using a demand simulator, it is possible to identify the features that consumers might want most, and then measure the price they are willing to pay for them. Demand simulators are discussed more fully below.

For example, certain features have more universal consumer appeal while other features appeal to a specific consumer characteristic. An optimization process creates focused sets of features. The process may organize product packages around central motivation factors, such as price points and common feature acceptance. Using feature interest as a motivating factor, the most popular features can be grouped to form a set of features that are both universally popular and provide an acceptable profit to an insurance carrier.

Differentiation is introduced by adding features to packages that specifically address the motivations of a specific consumer group. For example, some consumer groups are interested in security features, while others may have young drivers in the household. Because some consumers are highly driven by features while others are driven by price, package structures may be optimized based on price to motivate a consumer segment. Alternatively, package structures may be optimized based on features that appeal to less price-sensitive members of the consumer population. In addition, some optimized package structures may be based upon both price and feature considerations.

Insurance products generated according to the present invention may be offered for sale in a variety of manners. For example, consistent with the present invention, optimized packages may be offered through any form of visual display, either electronically or by the use of brochures, posters, signs, standing displays, and any other form of visual and/or written communication. In addition, one may offer optimized packages through an insurance carrier's agents in person, over the telephone, or via the Internet. In an Internet implementation, or over the telephone using a voice recognition system, such interactions may occur automatically.

Reference will now be made in detail to exemplary embodiments of the invention, examples of which are illustrated in the accompanying drawings. Wherever possible, the same reference numbers will be used throughout the drawings to refer to the same or like parts.

FIG. 1 is a flow chart for optimizing customizable insurance products, in accordance with an embodiment of the invention. One may optimize insurance products by designing packages using a process that takes into account the considerations discussed in further detail below.

First, features are identified as candidates to be offered as part of various packages, which together form an insurance product. Step 110. To identify those features that one might consider as candidates, business performance data may be analyzed. Business performance data may include different subsets of data obtained by collecting existing information from the marketplace to analyze for trends and to understand the landscape of available options. A possible subset of business performance data is market-share data, which includes industry data used to evaluate current levels of market share for particular consumers to determine demand generated by specific product offerings. In this step of the process, one might identify a target population and/or a market segment.

Other categories of data considered in this step include industry-product-offering data and internal-pricing data. Industry-product-offering data includes an evaluation of the products and features offered in policies from various insurance carriers. In addition, this data may be supplemented by internal pricing data proprietary to the insurance carrier conducting the demand simulation.

Internal-pricing data may include the insurance carrier's premiums, loss, and expense data so that the cost of features can be taken into account. Internal-pricing data allows one to compare a specific insurance carrier's ability to provide a product to consumers at a price consumers are willing to pay. Other ways of arriving at candidate features include brainstorming with experts, examining the current and past marketplace, and by soliciting and receiving suggestions and input from consumers and agents.

Next, the cost of each candidate feature is determined. Step 120. In determining costs of the candidate features, the losses that are expected for a particular feature are examined when determining the premium that consumers will pay.

Once candidate features and costs are determined, the demand for each feature in the marketplace is evaluated. Step 130. During the evaluation, consumer preferences are evaluated to form price utility curves, which are created after conducting consumer research to better understand consumer preferences for each feature or combination of features.

The process of evaluating demand may include collecting information using focus groups selected from different geographic regions. For example, persons participating in focus groups can be selected across all age groups that have actively shopped for insurance during an appropriate time frame. Selection of groups may occur on the basis of any identified target population and/or market segment. During this step, features may be eliminated from further consideration based upon the focus groups' preferences. In addition, focus groups may provide survey information identifying the price each individual was willing to pay for certain features. Such considerations may involve an evaluation of sample packages containing different combinations of features offered at different prices.

Next, features may be grouped into possible packages. Step 140. During this step, cost prohibitive features may be eliminated from packages because consumers may not be willing to pay the price of a particular feature. Also, strategic alternatives data may be examined, including price-point data and variable-feature-level data. Price point data includes an evaluation of a particular insurance carrier's current prices to competitors' prices and includes an evaluation of the impact of adding packaged features. Variable feature level data may be considered to describe the most compelling packages of features. Variable feature level data is derived from consumer research and includes uniqueness and differentiation of features to evaluate the best features and how features should be grouped in packages.

In addition, incremental costs of strategic alternatives data includes variable-feature-cost data and fixed-cost-investments data. Variable-feature-cost data describes an insurance carrier's proprietary loss and expense data and is used to determine a cost to offer a given feature. Fixed-cost investments data takes into account systems, infrastructure, and other costs associated with implementation of an optimized product architecture.

When designing packages, another concept that may be incorporated into the process is that of self-selection. For example, packages should include features that appeal to consumers in a particular need state such that these consumers will recognize the value of a particular package and consider including it in their insurance selections.

Next, demand is simulated using a demand simulator. Step 150. The demand simulator estimates the number of individuals that will purchase a particular product offering. Optimization of packages is accomplished by iteratively trying all possible package combinations or by determining which features may be substituted for other features in the most optimal packages to arrive at a set of features that provides an arrangement of features that a consumer would find of value.

The demand simulator may be implemented as a software module, which processes data provided to it. During the operation of the demand simulator, user input may provide the ability to select different features and to alter inputs to the module. Consistent with the present invention, processing may also occur automatically at the direction of optimization software including automated logic.

Features that are used by the demand simulator may be selected with utility-based product segmentation. As discussed above, price-utility curve data may be used to determine packages. A utility value for each feature may be determined through consumer research to identify the features most attractive to the overall target population as well as to subsets of the target population that form market segments. Features are then grouped into packages, and groups of packages form an insurance product.

After the demand simulator provides an initial processing of features, a user may decide whether to simulate demand again. Step 160. If the user decides to stop, the process ends. If the user decides to continue, the process goes to Step 170. In Step 170, processing may be further refined by re-examining costs of packages by examining different feature combinations based on particular judgment criteria. For example, if the cost of offering a particular package is high, it may be identified using variable-feature-cost data and fixed-cost investment data, as described above in connection with Step 120.

After inspecting the costs, certain features may be removed or added to packages. Step 180. User input may further provide the ability to select different features and to alter inputs to the module. The process then returns to simulate demand for the newly modified packages. Step 150.

Figure 2:
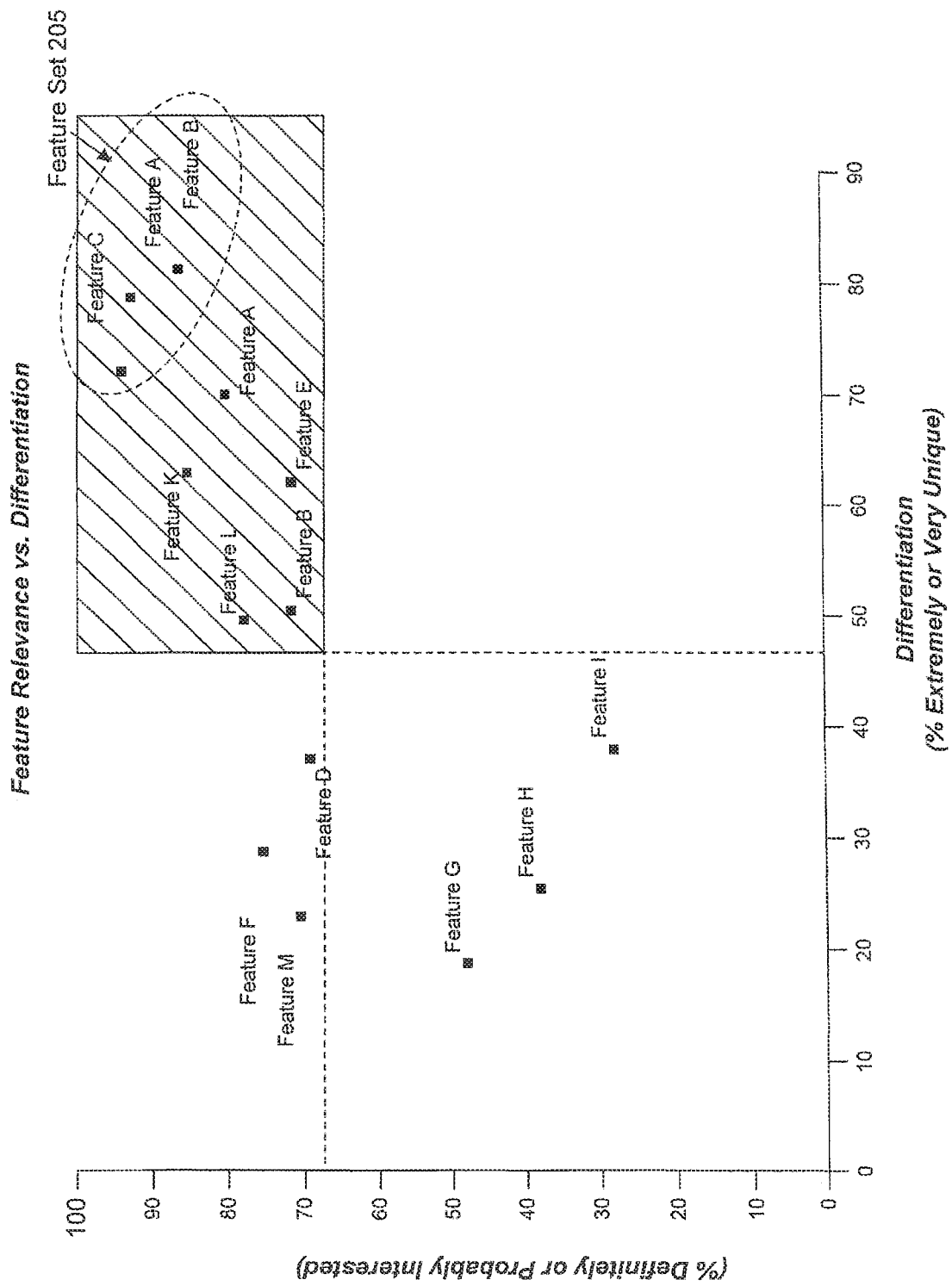
FIG. 2 is an exemplary chart comparing feature relevance and feature differentiation, in accordance with an embodiment of the invention.

FIG. 2 shows an exemplary chart comparing feature relevance and feature differentiation used to perform analysis used in optimizing features for packages. By plotting the data as shown in FIG. 2, it is possible to determine a feature set 205 that includes features that are highly relevant and distinctive. Such a process may be done for an entire population to arrive at feature set 205 and may also be done for sub-segments based on characteristics common to the sub-segments to determine the packages that most appeal to a particular group or subgroup.

Accordingly, research may be performed to identify a target population and a set of insurance features desired by the target population. The set of insurance features are bundled into an insurance package. A cost of the insurance package may be determined and the insurance package may be offered for sale.

Furthermore, the research to identify the insurance features may be carried out through an optimization process, as described above. In some embodiments, the optimization process is based upon consumer factors. In other embodiments, the optimization process is based also upon financial criteria that provide the insurance company with an acceptable profit. The research may also include examining common characteristics of the target population or of a market segment within the target population.

This procedure may be repeated for additional market segments. A set of ala carte features may also be identified and a cost for each of the ala carte features may also be identified, along with determining corresponding prices for the ala carte features and offering the ala carte features for sale at the corresponding prices.

In one embodiment of the invention, an optimized package includes a basic set of insurance features and may be offered for sale along with the insurance package. A standard package may include a set of insurance features required by a governing law. Alternatively, a standard package may also include a set of insurance features required by a financial institution.

For example, an optimized package may additionally include a set of insurance features created by performing research to identify a target population or a market segment. Alternatively, a standard package may also be combined with the optimized package to form a plan. Sets of additional insurance features may also be selected to form additional packages. Each plan may include a standard package and an optimized package.

In addition, a third party may sell optimized packages without a standard package. Such a situation might involve a third party's sale of optimized packages as additions to an existing insurance product. An insurance carrier has sold the existing insurance product to a consumer, who has then gone to a third party from which the consumer may obtain the optimized packages. The optimized packages, however, may be created or selected consistent with the principles of the present invention.

Figure 3:
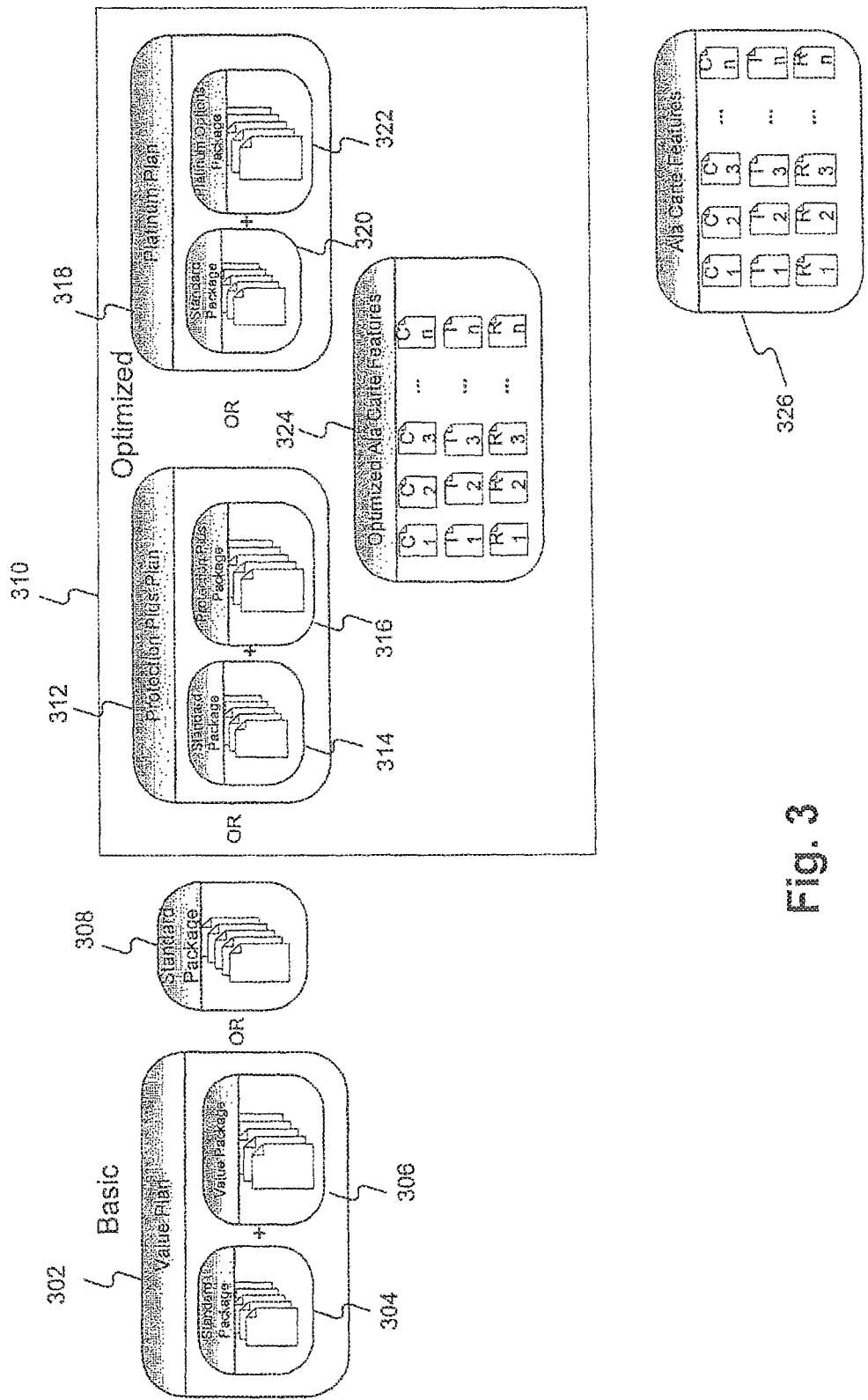
FIG. 3 is an exemplary method of offering insurance, in accordance with an embodiment of the invention.

FIG. 3 is an exemplary method of selling insurance, in accordance with an embodiment of the present invention. As shown in FIG. 3, a consumer is offered a variety of options. For example, a consumer may only want to purchase a basic insurance product. That consumer may select a standard package 308. Alternatively, the consumer may select a value plan 302, which includes a standard package 304 and a value package 306 with additional features.

However, if a consumer would like to purchase more than a basic insurance product, the consumer may select from optimized package group 310. FIG. 3 includes two exemplary optimized packages: a protection plus plan 312 and a platinum plan 318. Protection plus plan 312 includes a standard package 314 and a protection plus package 316. Protection plus package 316 may include features such as a repair/replace feature and a loan/lease-gap coverage feature. Alternatively, the consumer may select platinum plan 318, which includes a standard package 320 and a platinum options package 322. Platinum options package 322 may include features such as a repair/replace feature, a loan/lease-gap coverage feature, a monetary death indemnity feature, and a full roadside assistance feature.

In addition, the consumer may select from optimized ala carte features 324. Optimized ala carte features 324 are individual features sold separately as add-ons to certain optimized packages. Optimized ala carte features 324 have been keyed as a group to share an attribute. In addition, the consumer may also select from a general group of ala carte features 326 that have not been optimized. As shown in FIG. 3, there are many possible combinations and variations from which a consumer may select to form an insurance product.

Figure 4:
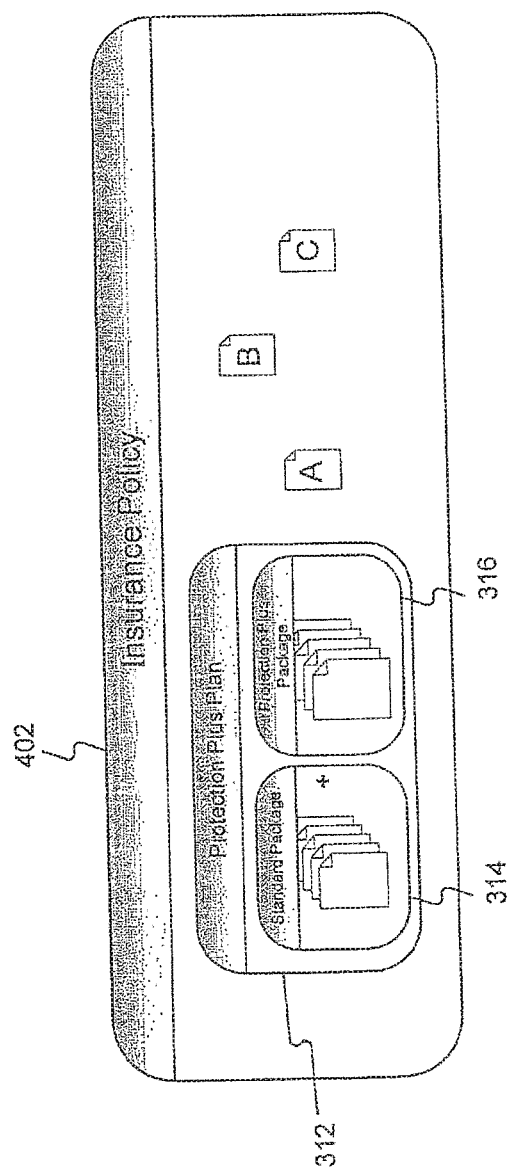
FIG. 4 shows an exemplary insurance product comprising packages selected from FIG. 3, in accordance with an embodiment of the invention.

FIG. 4 shows an exemplary insurance product comprising packages selected from FIG. 3. The example shown in FIG. 4 displays a possible selection that a consumer may make from the options provided in FIG. 3 to form insurance product 402. Insurance product 402 includes protection plus plan 312, which includes standard package 314 and protection plus package 316. In addition, insurance product 402 includes several ala carte features labeled A, B, and C, which may or may not be optimized.

Figure 5:
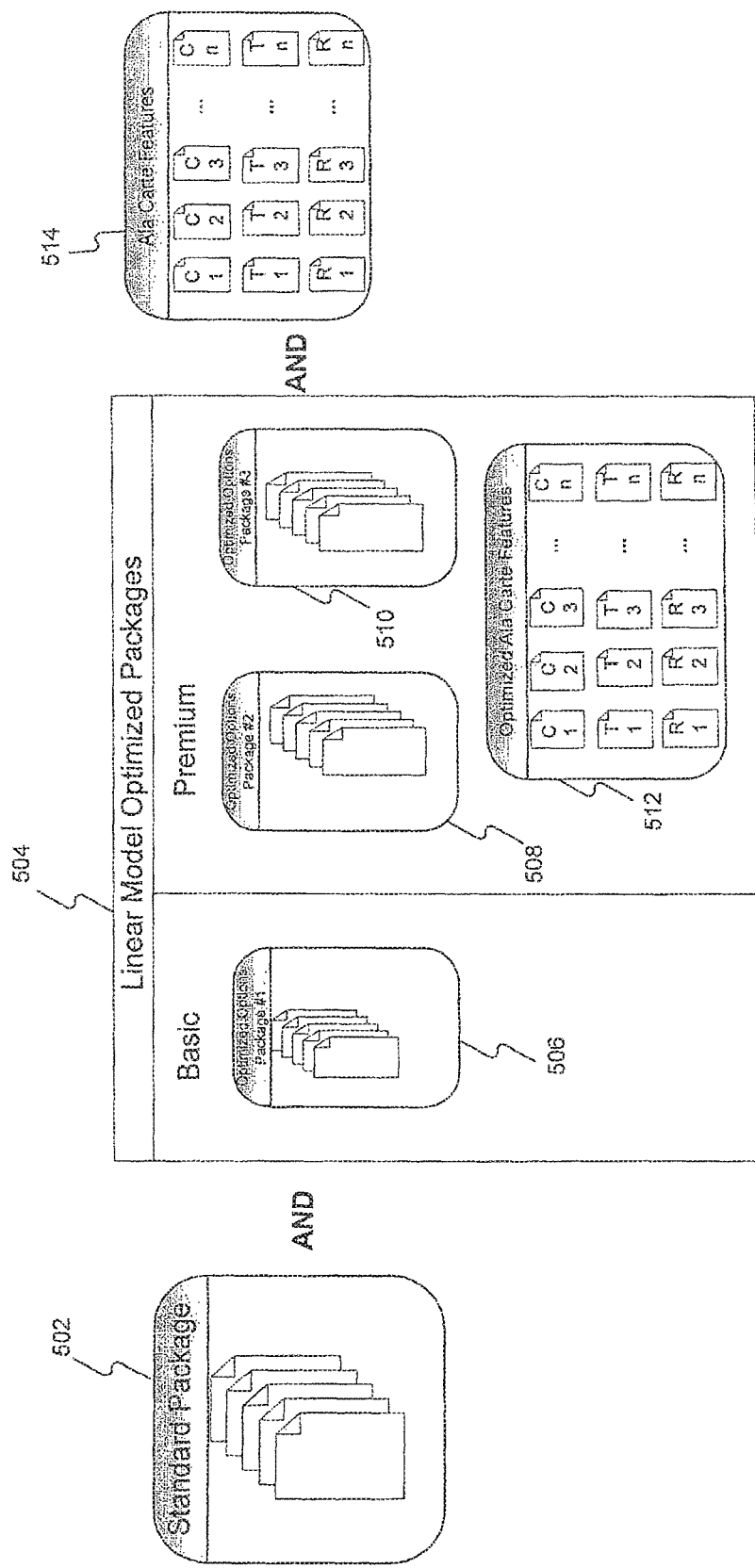
FIG. 5 is another exemplary method of offering insurance, in accordance with an embodiment of the invention.

FIG. 5 is another exemplary method of selling insurance in accordance with an embodiment of the invention. In the method shown in FIG. 5, a consumer combines packages in a linear fashion to form an insurance product. For example, the consumer selects a standard package 502. Since standard package 502 meets the minimum requirements for an insurance product, the consumer may decide only to purchase standard package 502. However, the consumer may also decide to select additional optimized packages from optimized package group 504. For example, the consumer may also select optimized options package 506, which is considered a "basic" optimized package. In addition, however, the consumer may also select optimized options package 508 and/or optimized options package 510. These additional optimized packages are considered "premium" packages because they offer additional features at a cost greater than the basic optimized package. Furthermore, optimized packages 506-510 may include features optimized in a manner consistent with the present invention. In some embodiments, a consumer may be required to first select, for example, a particular optimized options package before the consumer may select a further optimized package. Such a "tiered" arrangement requires the purchase of an initial optimized package as a prerequisite before additional optimized packages may be purchased.

Once the consumer has selected optimized options package 508 or optimized options package 510, the consumer may also select any one or more optimized ala carte features 512. Additionally, a consumer that has selected any one of optimized options packages 506-510 may also select one or more ala carte features 514. As shown in FIG. 5, there are many possible combinations and variations from which a consumer may select to form an insurance product.

Figure 6:
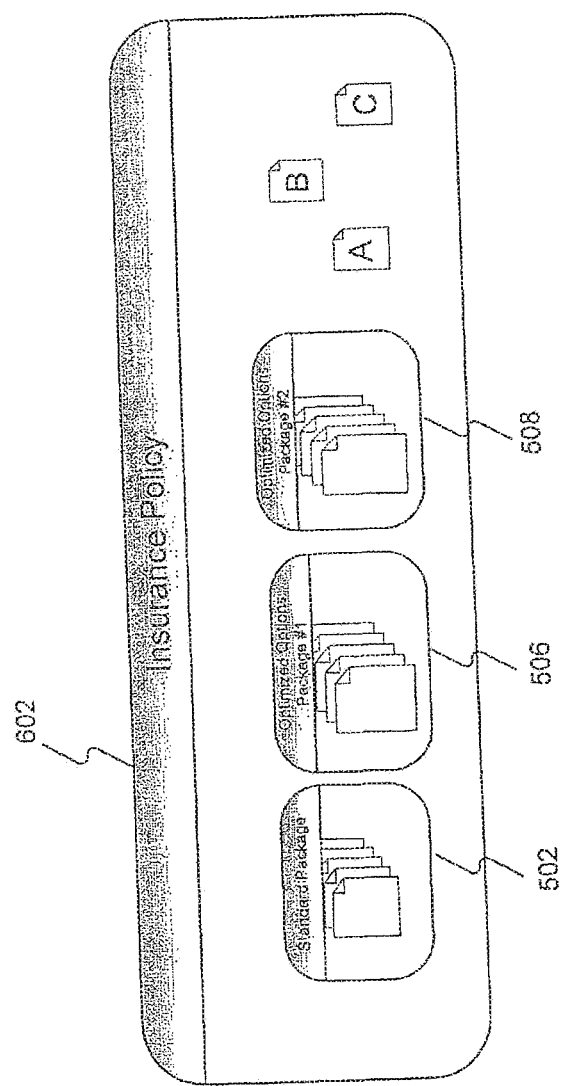
FIG. 6 shows an exemplary insurance product comprising packages selected from FIG. 5.

FIG. 6 shows an exemplary insurance product comprising packages from FIG. 5. The example in FIG. 5 shows a possible selection that a consumer may make to form insurance product 602. Insurance product 602 includes standard package 502, optimized package 506, and optimized package 508. In addition, insurance product 602 includes several ala carte features A, B, and C, which may or may not be optimized.

Figure 6A:
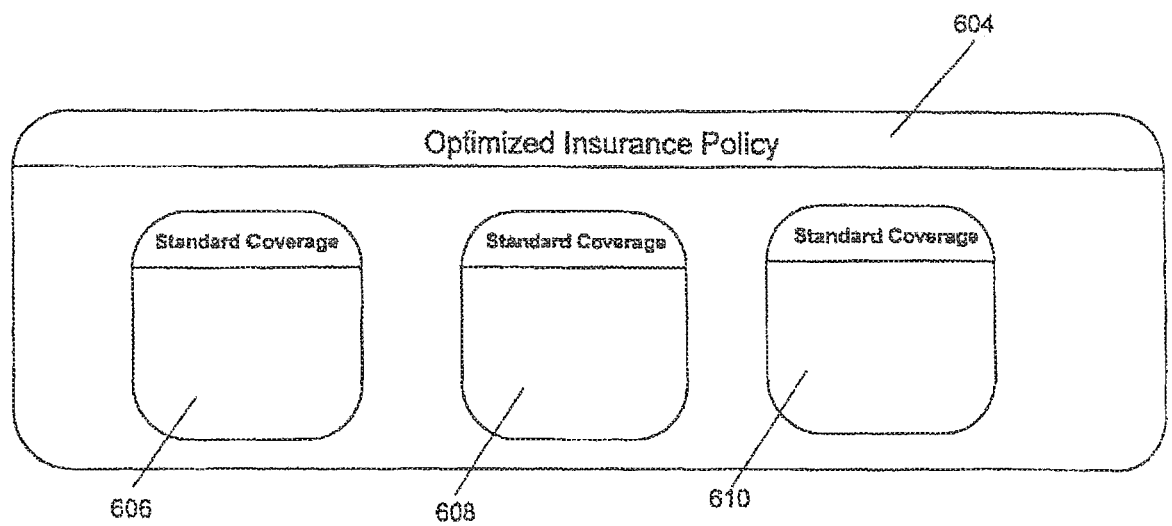
FIG. 6A shows an optimized insurance policy that includes a combination of standard coverage components, in accordance with an embodiment of the invention.
Figure 6B:
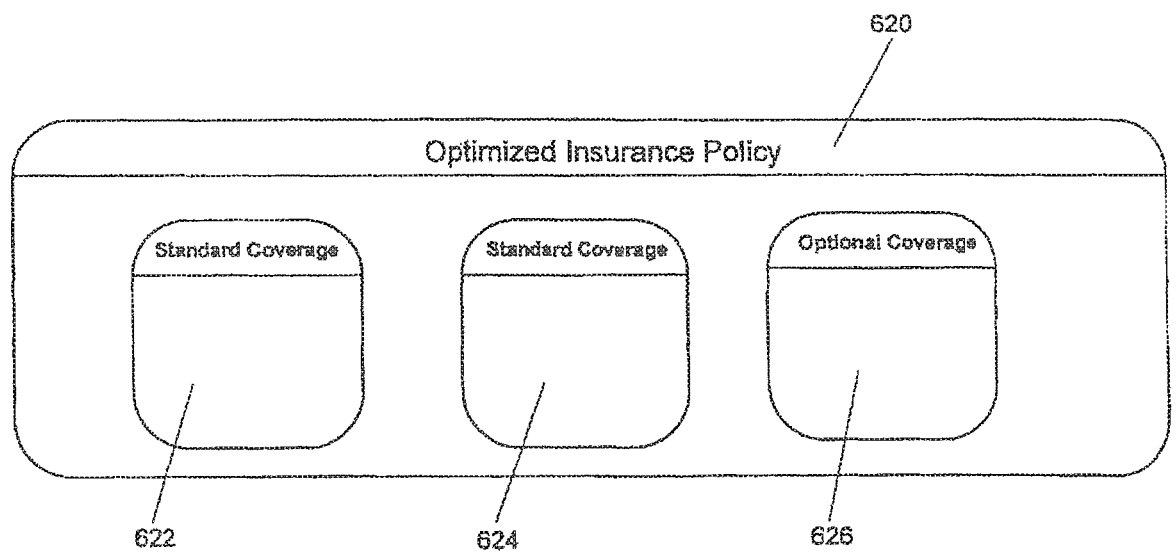
FIG. 6B shows an exemplary optimized insurance policy that includes standard coverage components and an optional coverage component, in accordance with an embodiment of the invention.

Those skilled in the art will appreciate that aspects of the invention may be applied to create a variety of different insurance products. The insurance products may include combinations of optimized components, optimized combinations of standard components and combinations of both. FIG. 6A, for example, shows an optimized insurance policy 604 that includes a combination of standard coverage components 606, 608 and 610. In one implementation, optimized insurance policy 604 is a homeowner's insurance policy. FIG. 6B illustrates an exemplary optimized insurance policy 620 that includes standard coverage components 622 and 624 and an optional coverage component 626. Optional coverage component 626 may include a grouping of insurance features that share a common attribute.

Figure 7:
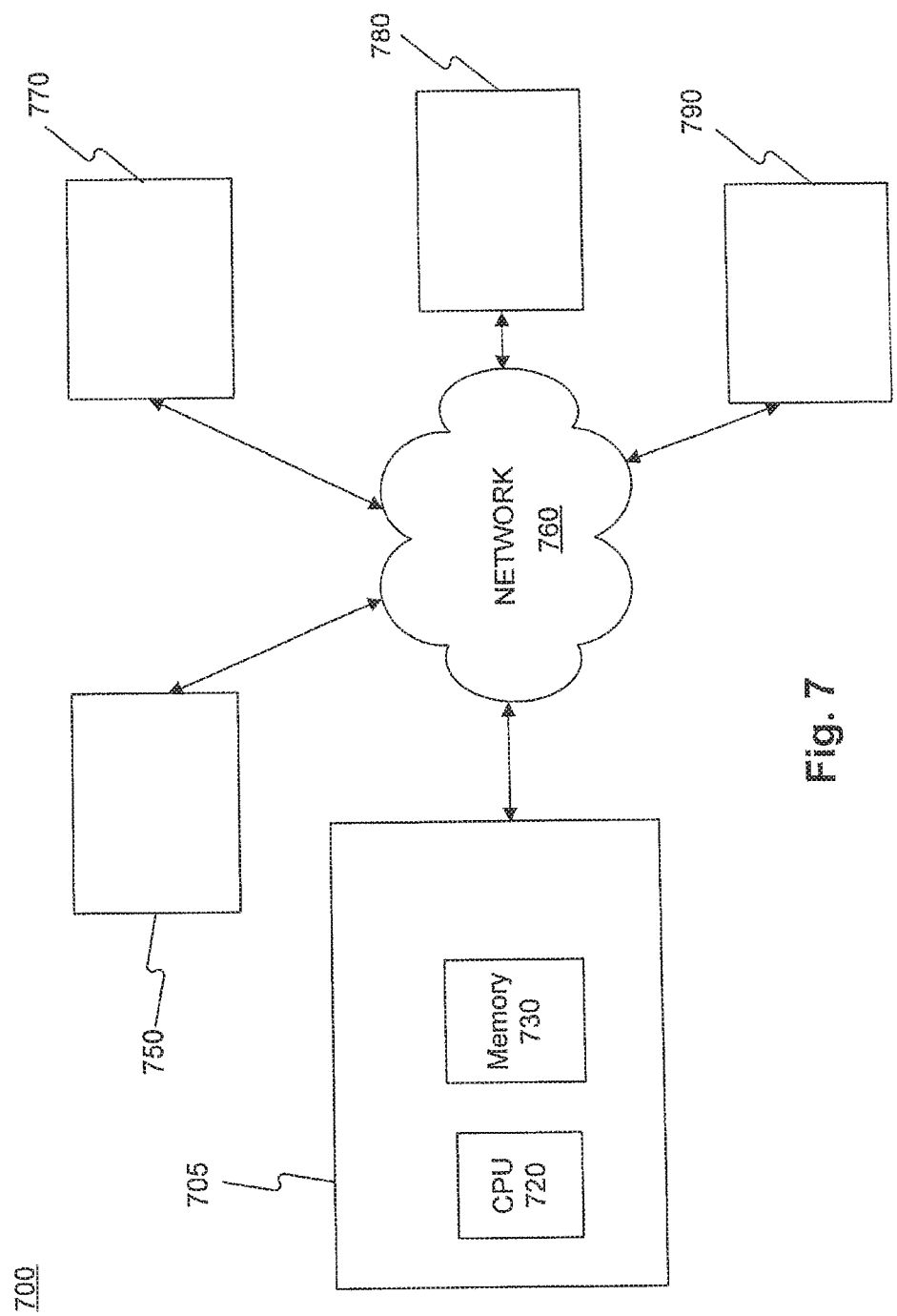
FIG. 7 is an exemplary system, in accordance with an embodiment of the invention.

FIG. 7 illustrates a system 700 that may be used to implement at least some of the methods described above, in accordance with an embodiment of the present invention. System 700 includes a server 705, connected to a network 760, including a CPU 720 and a memory 730. Software loaded into memory 730 from, for example, a disk drive (not shown) at the direction of CPU 720 may be used to implement a program for optimizing insurance in a manner consistent with various embodiments of the present invention. For example, the software may execute instructions for performing demand simulation to analyze data and to form optimized packages. In addition, memory 730 may store, for example, a database (not shown) of market data and store research conducted to design packages.

Additionally, network 760 provides communications between the various entities in system 500, such as user terminals 770-790. Network 760 may be a shared, public, or private network and encompass a wide area or local area. Further, network 760 may be implemented through any suitable combination of wired and/or wireless communication networks. By way of example, network 760 may be implemented through a wide area network (WAN), local area network (LAN), an intranet, or the Internet.

Terminals 770-790 allow a user to exchange information with server 760. Terminals 770-790 may be any type of appropriate device for communicating with server 705 over network 760. For example, terminal 770 may be a PDA running a program for communicating with server 705, while terminal 780 may be a desktop type computer running a web browser for communicating with sever 705 via the Internet. Terminal 790 may be a standard landline telephone or wireless phone.

Users may access server 705 via network 760 to customize an automobile insurance product through a web browser running on, for example, terminal 780. A website may include options to provide information or to fill out an application, and may present the user with a series of screens prompting the user to make various selections. The user may make appropriate selections to customize the insurance product. Additionally, a user at terminal 790, a telephone, may contact a consumer service representative at terminal 750. The consumer service representative may assist a consumer through a process that the customer can use to consider options for customizing an insurance product by asking a series of questions. During the process, the consumer service representative may use software running on terminal 750, and may send data to and from server 705.

Aspects of the invention may be used in connection with automobile insurance, homeowner's insurance and other types of insurance. One of skill in the art will readily recognize how to adapt the methodology described above to a variety of areas of insurance. For example, consistent with aspects of the present invention, an insurance carrier may expand its homeowner's insurance offerings to consumers by identifying features with appeal and profitability to design packages of related features at different pricing points. Customizable homeowner's insurance may include a standard package of typical coverages, and a consumer may further select optimized packages of features in a manner similar to that discussed above.

A homeowner's insurance product typically covers a building or structures on the premises and household personal property. A typical homeowner's insurance product usually also includes certain personal liability coverage and coverage for medical payments to others. Additional coverages or features are purchased ala carte.

Homeowner's insurance consistent with aspects of the present invention provides optional coverages that reflect different lifestyles and life stage needs. In particular, by implementing a methodology consistent with that described above, one may also create optimized homeowner packages. Optimized solutions may include coverages that are popular with most homeowners, as well as optimized coverages, that align with the wants and needs of a given consumer. Consumers may be offered optimized packages of coverages and terms that share a common attribute. Common attributes may relate to electronic data recovery, home enterprises, identity restoration, music & photography, prized possessions, jewelry, sports & leisure, yard & garden or other areas that present particular liability concerns to at least a group of consumers.

Optional insurance component 626 (shown in FIG. 6B) may include a grouping of insurance features that share a common attribute, such as one of the attributes described above. An electronic data recovery component may provide reimbursement for expenses incurred from an attempt to restore lost data resulting from a covered loss or computer virus. The coverage may have a limit, such as $5,000. A home enterprise coverage component may bundle increased limits for consumers who work from their home in an office/studio setting and desire additional protection for business property, liability, and/or office/studio equipment and furniture. In one embodiment of the invention, a home enterprise coverage component includes the features of an electronic data recovery component. An identity restoration component may reimburse consumers for lost wages and other covered expenses resulting from identity theft. The coverage may have a limit, such as $25,000 and may have no deductible. A music & photography component may include a bundle of increased limits for consumers who have musical instruments and photography equipment. A prized possessions component may include a bundle of increased coverage limits for consumers who have acquired certain types of assets, such as silverware, jewelry, furs, etc. A sports & leisure component may include a bundle of increased limits for consumers who have sports equipment and/or small watercraft.

A yard & garden component may include a bundle of increased limits for trees, shrubs, landscaping and other plants. The bundle may include coverage for motorized land vehicles used to service the residence premises. An increased limit, such as 10% or $1,000 per tree, may be included for replacement and debris removal of trees for certain perils. In certain embodiments increased debris removal coverage may be included in the bundle for the perils such as windstorm, hail, weight of ice, snow and sleet.

One of skill in the art will appreciate that aspects of the invention may be used to create insurance coverage packages that include standard homeowner's coverage components and at least one homeowner's component having a grouping of insurance features that share other common attributes. Exemplary common attributes may relate to home value protection, identity theft, blanket protection of valuables, limited personal umbrella policy coverage and any other attributes or combination of attributes that are desired by at least a group of consumers.

Figure 8:
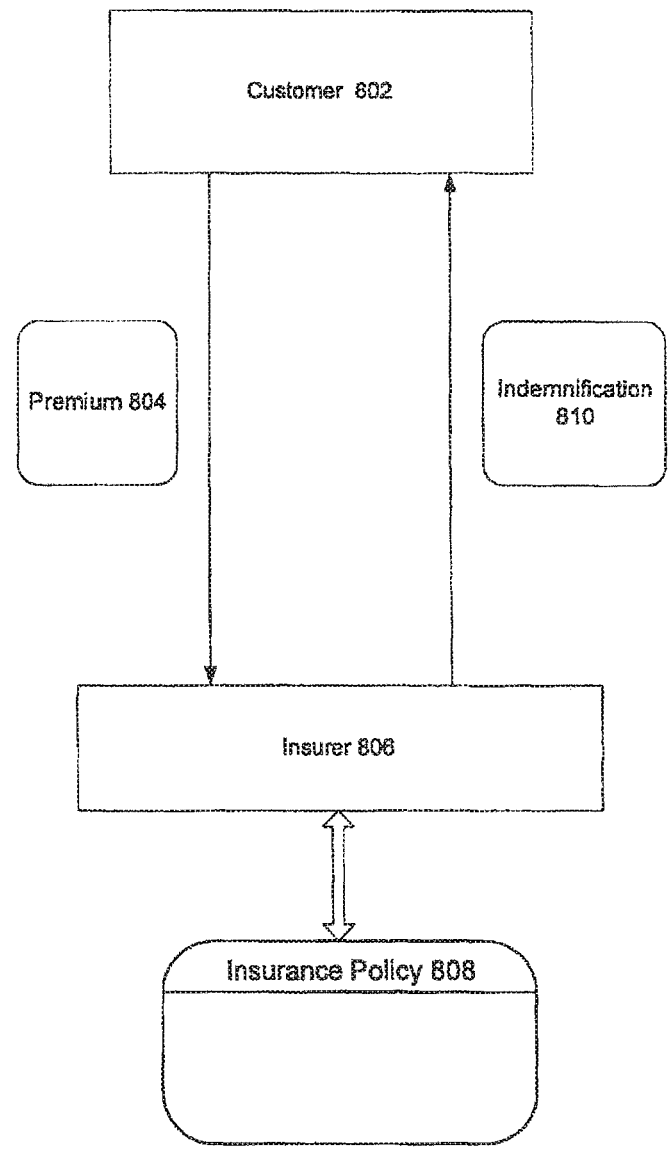
FIG. 8 illustrates a process of providing insurance coverage that may be used in connection with various embodiments of the invention.

FIG. 8 illustrates a process of providing insurance coverage that may be used in connection with the embodiments of the invention described herein. A customer 802 pays a premium 804 to an insurer 806. The premium is provided in exchange for insurance coverage described in an insurance policy 808. Insurer 806 provides indemnification 810 to customer 802 when an event covered by insurance policy 808 occurs.

Personal automobile and homeowners insurance are examples of property and casualty insurance offerings. One skilled in the art will recognize that the above-described methodology is applicable to other types of insurance products as well, such as commercial insurance for business customers. In addition, an insurance carrier may offer annuity products to consumers for retirement or financial planning purposes by identifying features with appeal and profitability to design packages of related features at different pricing points or expense levels. Customizable annuity products may include a standard annuity with typical accumulation, return, and payout features. A consumer may further select enhanced packages of features in a manner similar to that discussed above for automobile insurance.

Additional embodiments of the present invention are possible, each designed to cover other classes of insurable risk, including but not limited to, mortality risk and life insurance products; morbidity risk and health and long-term care insurance products; as well as professional practice risk and liability insurance.

Although not common in today's marketplace, it is possible to apply the disclosed methodology to so-called hybrid or multi-risk products that combine the coverages of two or more products from different classes of insurance risk into a single product. Customizable hybrid products may include a standard package across two or more risk classes with typical features in each class and a consumer may further select enhanced packages of features in a manner similar to that discussed above for automobile insurance.

The foregoing descriptions of the invention have been presented for purposes of illustration and description. They are not exhaustive and do not limit the invention to the precise form disclosed. Modifications and variations are possible in light of the above teachings or may be acquired from practicing of the invention. For example, the described implementation includes software but the present invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

Other embodiments of the invention will be apparent to those skilled in the art from consideration of the specification and practice of the invention disclosed herein. The specification and examples should be considered as exemplary only, with a true scope and spirit of the invention being indicated by the following claims.

What is claimed is:

1. A computer server, comprising:
   a network interface that communicates over a communication network, wherein the network interface:
   receives an access request sent from a first terminal computing device;
   provides one or more website screens to the first terminal computing device in response to the access request; and
   receives selection information identifying one or more selections made by a user of the first terminal computing device via the one or more website screens, the one or more selections indicating one or more characteristics of the user;
   a processor that executes instructions stored in memory, wherein the processor executes the instructions to perform the steps of:
   using a demand simulator to perform a multidimensional analysis of the characteristics and to predict one or more preferences of a population segment associated with the characteristics;
   customizing an automobile insurance policy to include one or more features selected based on the one or more predicted preferences, the one or more selected features including an optional accident waiver enhancement feature that allows the automobile insurance policy to be maintained when a first rate-affecting accident occurs during a policy period of the optional accident waiver enhancement feature and further allows the automobile insurance policy to be maintained when a second rate-affecting accident occurs during a subsequent policy period of the optional accident waiver enhancement feature based on a predetermined amount of time having elapsed since the first rate-affecting accident, wherein the optional accidence waiver enhancement feature allows the automobile insurance policy to be altered based on the predetermined amount of time not having elapsed between the first rate-affecting accident and the second rate-affecting accident; and
   updating the one or more website screens with a visual display of the customized automobile insurance policy that includes the one or more selected features.

2. The computer server of claim 1, wherein the first terminal computing device is associated with a customer.

3. The computer server of claim 1, wherein the first terminal computing device is associated with a customer service representative.

4. The computer server of claim 1, further comprising sending, to the first terminal computing device, data indicating that the automobile insurance policy will be maintained without altering the automobile insurance policy based on the second rate-affecting accident.

5. The computer server of claim 1, further comprising sending, to the first terminal computing device, data indicating that the automobile insurance policy will be altered based on the second rate-affecting accident.

6. A method, comprising:
receiving, via a communication interface that communicates over a communication network, an access request sent from a first terminal computing device
providing one or more web site screens to the first terminal computing device in response to the access request;
receiving selection information identifying one or more selections made by a user of the first terminal computing device via the one or more website screens, the one or more selections indicating one or more characteristics of the user;
using a demand simulator to perform a multidimensional analysis of the characteristics and to predict one or more preferences of a population segment associated with the characteristics;
customizing an automobile insurance policy to include one or more features selected based on the one or more predicted preferences, the one or more selected features including an optional accident waiver enhancement feature that allows the automobile insurance policy to be maintained when a first rate-affecting accident occurs during a policy period of the optional accident waiver enhancement feature and further allows the automobile insurance policy to be maintained when a second rate-affecting accident occurs during a subsequent policy period based on a predetermined amount of time having elapsed since the first rate-affecting accident, wherein the optional accidence waiver enhancement feature allows the automobile insurance policy to be altered based on the predetermined amount of time not having elapsed between the first rate-affecting accident and the second rate-affecting accident; and
updating the one or more website screen with a visual display of the customized automobile insurance policy that includes the one or more selected features.

7. The method of claim 6, wherein the first terminal computing device is associated with a customer.

8. The method of claim 6, wherein the first terminal computing device is associated with a customer service representative.

9. The method of claim 6, further comprising sending, to the first terminal computing device, data indicating that the automobile insurance policy will be maintained without altering the automobile insurance policy based on the second rate-affecting accident.

10. The method of claim 6, further comprising sending, to the first terminal computing device, data indicating that the automobile insurance policy will be altered based on the second rate-affecting accident.

11. One or more non-transitory computer-readable storage media storing instructions that, when executed by a computer server comprising at least one processor and memory, cause the computer server to:
receive, via a network interface the communicates over a communication network, an access request sent from a first terminal computing device;
provide one or more website screens to the first terminal computing device in response to the access request;
receive selection information identifying one or more selections made by a user of the first terminal computing device via the one or more website screens, the one or more selections indicating one or more characteristics of the user;
use a demand simulator to perform a multidimensional analysis of the one or more characteristics and to predict one or more preferences of a population segment associated with the one or more characteristics;
customize an automobile insurance policy to include one or more features selected based on the one or more predicted preferences, the one or more selected features including an optional accident waiver enhancement feature that allows the automobile insurance policy to be maintained when a first rate-affecting accident occurs during a policy period of the optional accident waiver enhancement feature and further allows the automobile insurance policy to be maintained when a second rate-affecting accident occurs during a subsequent policy period of the optional accident waiver enhancement feature based on a predetermined amount of time having elapsed since the first rate-affecting accident, wherein the optional accidence waiver enhancement allows the automobile insurance policy to be altered based on the predetermined amount of time not having elapsed between the first rate-affecting accident and the second rate-affecting accident; and
update the one or more website screens with a visual display of the customized automobile insurance policy that includes the one or more selected features.

12. The one or more non-transitory computer-readable media of claim 11, wherein the first terminal computing device is associated with a customer.

13. The one or more non-transitory computer-readable media of claim 11, wherein the first terminal computing device is associated with a customer service representative.

14. The one or more non-transitory computer-readable media of claim 11, further comprising sending, to the first terminal computing device, data indicating that the automobile insurance policy will be maintained without altering the automobile insurance policy based on the second rate-affecting accident.

15. The one or more non-transitory computer-readable media of claim 11, further comprising sending, to the first terminal computing device, data indicating that the automobile insurance policy will be altered based on the second rate-affecting accident.

* * * * *